(12) United States Patent
Della Monica et al.

(10) Patent No.: US 11,474,865 B2
(45) Date of Patent: Oct. 18, 2022

(54) ALLOCATION SCHEMA FOR A SCALABLE MEMORY AREA

(71) Applicant: Micron Technology, Inc., Boise, ID (US)

(72) Inventors: Angelo Della Monica, Casaluce (IT); Paolo Papa, Naples (IT); Carminantonio Manganelli, Benevento (IT); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 607 days.

(21) Appl. No.: 16/549,218

(22) Filed: Aug. 23, 2019

(65) Prior Publication Data

US 2021/0055966 A1  Feb. 25, 2021

(51) Int. Cl.
*G06F 9/50* (2006.01)
*G06F 12/1009* (2016.01)
*G06F 3/06* (2006.01)

(52) U.S. Cl.
CPC .......... *G06F 9/5016* (2013.01); *G06F 3/0608* (2013.01); *G06F 3/0643* (2013.01); *G06F 3/0673* (2013.01); *G06F 12/1009* (2013.01)

(58) Field of Classification Search
CPC .. G06F 12/1009; G06F 3/0673; G06F 3/0643; G06F 3/0608; G06F 9/5016
See application file for complete search history.

(56) References Cited

U.S. PATENT DOCUMENTS

| | | | |
|---|---|---|---|
| 9,697,219 B1* | 7/2017 | Wang | G06F 16/1734 |
| 2011/0296123 A1* | 12/2011 | Adler | G06F 12/0246 |
| | | | 711/E12.001 |
| 2016/0170833 A1* | 6/2016 | Segura | G06F 11/1088 |
| | | | 714/6.23 |
| 2016/0342509 A1* | 11/2016 | Kotte | G06F 12/0638 |
| 2017/0177497 A1 | 6/2017 | Chun et al. | |
| 2019/0310796 A1* | 10/2019 | Perez | G06F 3/0679 |
| 2019/0325048 A1* | 10/2019 | Watkins | G06F 16/2358 |
| 2020/0218471 A1* | 7/2020 | Chen | G06F 3/0631 |

* cited by examiner

*Primary Examiner* — Edward J Dudek, Jr.
(74) *Attorney, Agent, or Firm* — Schwegman Lundberg & Woessner, P.A.

(57) ABSTRACT

A variety of applications can include systems and methods that control a memory size of a changelog in a storage device, where the changelog is implemented to correlate virtual page addresses to physical addresses in one or more memory devices. The memory size can be controlled by an allocation schema for a scalable memory area for the changelog in the storage device. The allocation schema can include using bitmaps, lists linked to the bitmaps, and a counter to count bits asserted in the bitmaps such that the allocation of memory space in the storage device can depend on usage rather than allocating a large memory space for all possible correlations of virtual page addresses to physical addresses.

30 Claims, 12 Drawing Sheets

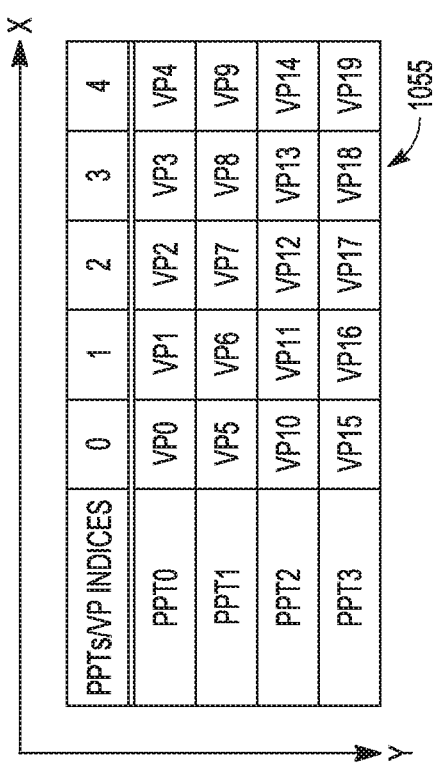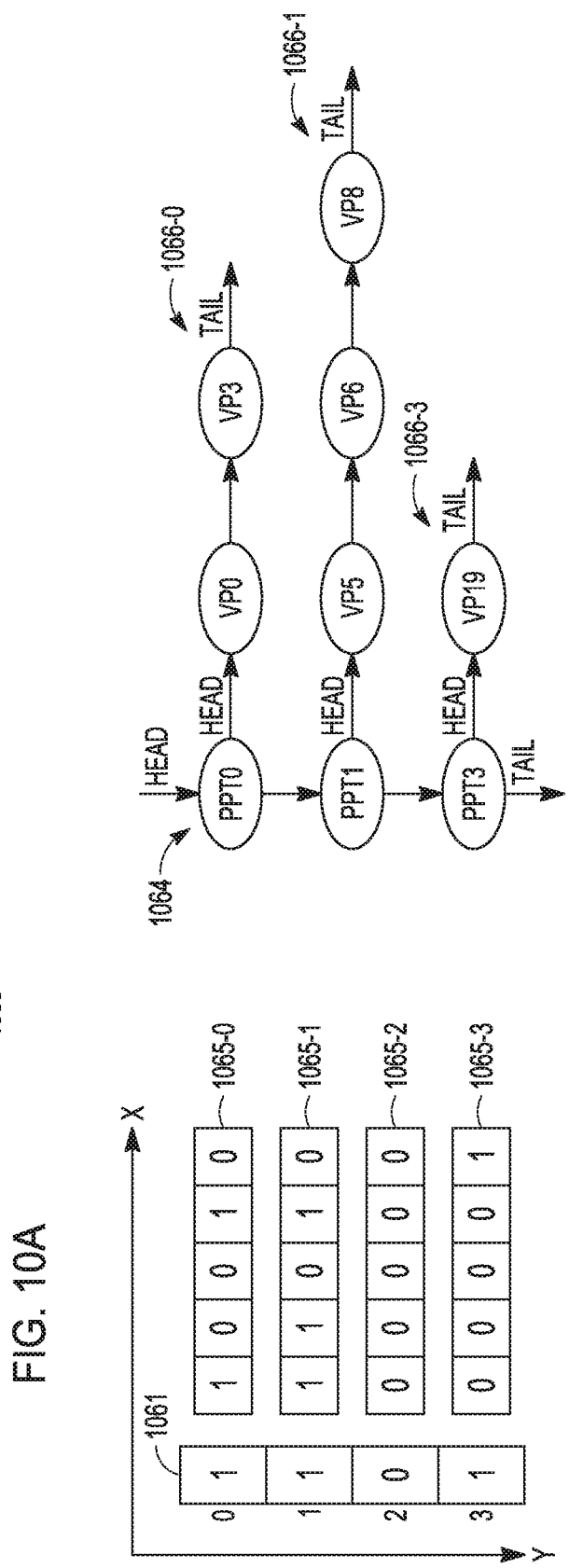
FIG. 10A
FIG. 10B
FIG. 10C
FIG. 10D

ALLOCATION SCHEMA FOR A SCALABLE MEMORY AREA

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). Ina NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. Unless otherwise clearly indicated by express language or context, MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a siring of storage cells to form a channel for the storage cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells, to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations, to transfer data (e.g., user data and associated integrity data, such as error data and address data, etc.) between the memory devices and the host, or erase operations to erase data from the memory devices.

In systems having managed memory devices operable with a number of host devices, accessing memory locations for reading from and writing to a memory device by a host device is accomplished with addresses provided by the host. These addresses can be provide by the host as logical block address (LBAs), where the host does not track the physical address of the memory location to be accessed. The managed memory devices include instrumentalities to translate a LBA from the host to a physical address in which data is stored in the memory device. The memory device can be a NAND memory device. This pair of information, LBA and corresponding physical address, can be stored as element inside a changelog. To always ensure a correct logical to physical (L2P) translation, a device translation unit (DTU) can be searched in the changelog for the latest updated information about the requested LBA. A conventional structure for a changelog is arranged to contain the history of each traced LBA, which can result in delays when accessing the changelog. However, an approach to rapid access to the requested information can be based on an ordered changelog, which implies additional effort on each update. In addition, ordering and access time depends on the DTU algorithm implemented, but regardless of the DTU algorithm used, the access is proportional to changelog size.

BRIEF DESCRIPTION OF THE DRAWINGS

The drawings, which are not necessarily drawn to scale, illustrate generally, by way of example, but not by way of limitation, various embodiments discussed in the present document.

FIGS. 10A-10D illustrate an example of implementing a changelog indexing scheme that can reduce memory area used for a changelog, in accordance with various embodiments.

DETAILED DESCRIPTION

Figure 1:
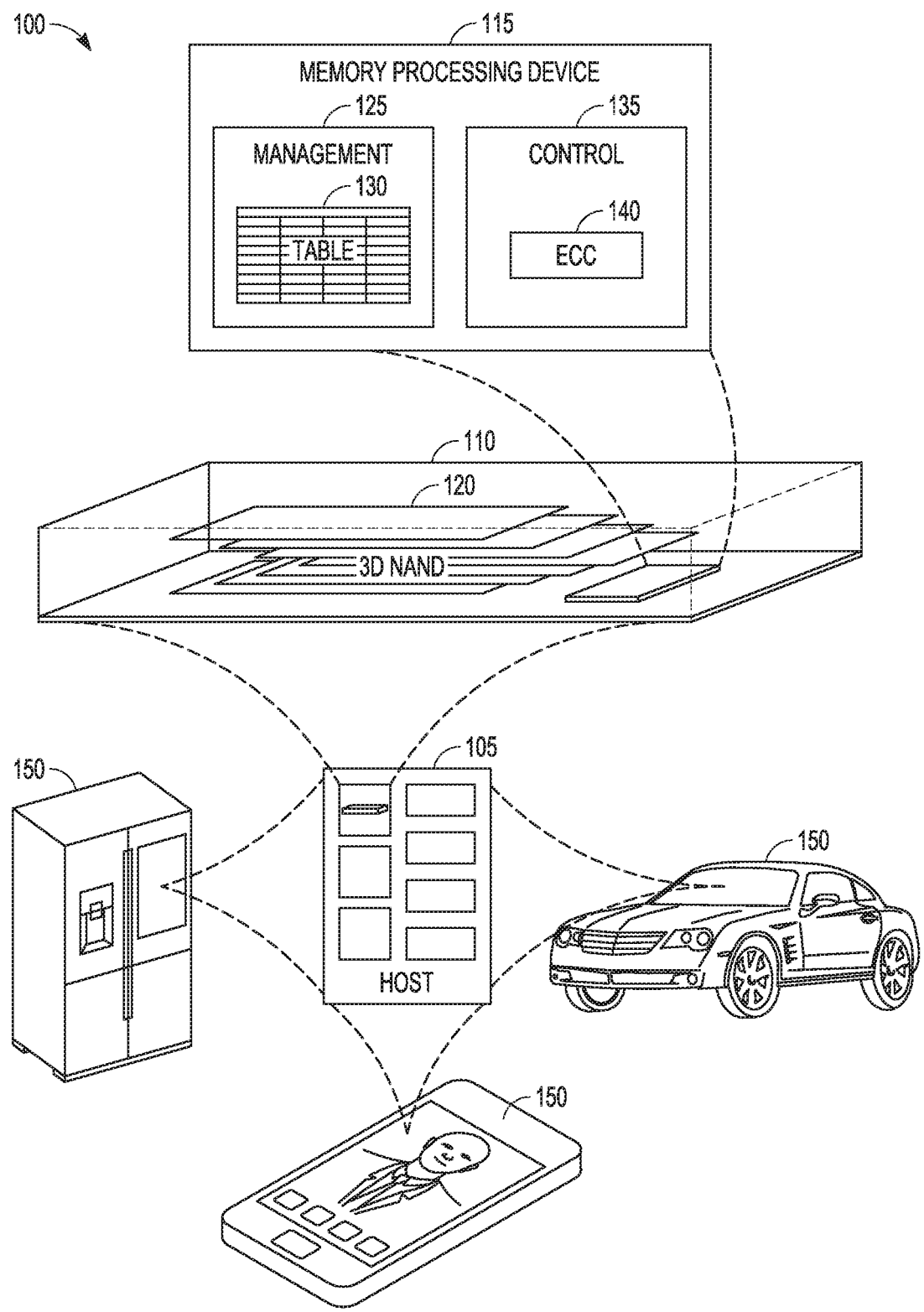
FIG. 1 illustrates an example of an environment including a memory device, in accordance with various embodiments.

The following detailed description refers to the accompanying drawings that show, by way of illustration and not limitation, various embodiments in which an invention can be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, an allocation schema for a scalable memory area is provided for storing a L2P changelog. In a firmware (FW) architecture based on changelog, the changelog can contain the most recent L2P values. For a NAND memory system, the changelog can be updated on write operations, while the L2P table is updated and flushed to NAND only when one among different events occurs, for example, when the changelog becomes full. The changelog becoming full can trigger update of L2P tables. During a read operation, the changelog is searched for the L2P value and, in case of the L2P value that is the subject of the search found missing in the changelog, then the L2P table can be loaded and the search can be performed into the L2P table.

This allocation schema can potentially cover the LBAs of a whole managed device in a reduced memory area. The memory area for storing the changelog can be a RAM memory area, where, in conventional arrangements, the memory area stores all history of the written LBA. A changelog, as taught herein, can be implemented to correlate virtual page addresses to physical addresses of a memory device in which ordering in the changelog can be addressed without application of an algorithm such as a DTU algorithm. The virtual page addresses can be realized as LBAs. Herein, a virtual page address is given the nomenclature, VP. In such a changelog, the story of an LBA is not traced, since the latest useful update is stored, which allows for avoidance of duplicates. Further, the changelog can be structured to correlate a virtual page address to a physical address without storing a pair of information, such as the logical and the physical address as a pair in a given memory device, such as a NAND device.

The changelog can be viewed as an indexable data structure, where a logical address is an entry point to know the physical address for a data storage location in a memory device associated with the changelog. This elimination of storing pairs of information reduces the memory used to store each single VP element. In the approach to a changelog, as taught herein, rather than a search of a VP element in the changelog, its presence and its position can be verified almost instantly, in which the number of steps to reach the desired changelog element s deterministic and predicable.

In various embodiments, a difference between a FW architecture based on a changelog and an architecture without changelog includes the feature that during write operation it is not needed to load the L2P Table in RAM but only the changelog is updated. Instead of loading the L2P Table to be updated, the new L2P value is temporarily saved into the changelog that resides in RAM. This provides that, in a random write scenario, continuously swapping in/out L2P Tables from the RAM can be avoided. All the L2P values updated can be collected into the changelog and, when the changelog becomes full, all the L2P tables to be updated can be loaded and merged with changelog updates.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 10 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory processing device 115 can include, among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (I/O) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, au ECC engine or other circuitry configured to detect or correct errors associated with writing data to or reading data from one or more memory cells of the memory device 110 coupled to the memory processing device 115. The memory processing device 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page; whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or may use different amounts of metadata associated therewith. For example, different memory device types may have different bit error rates, which can lead to different amounts of metadata to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may use more metadata bytes for error data than the corresponding SLC device.

Figure 2:
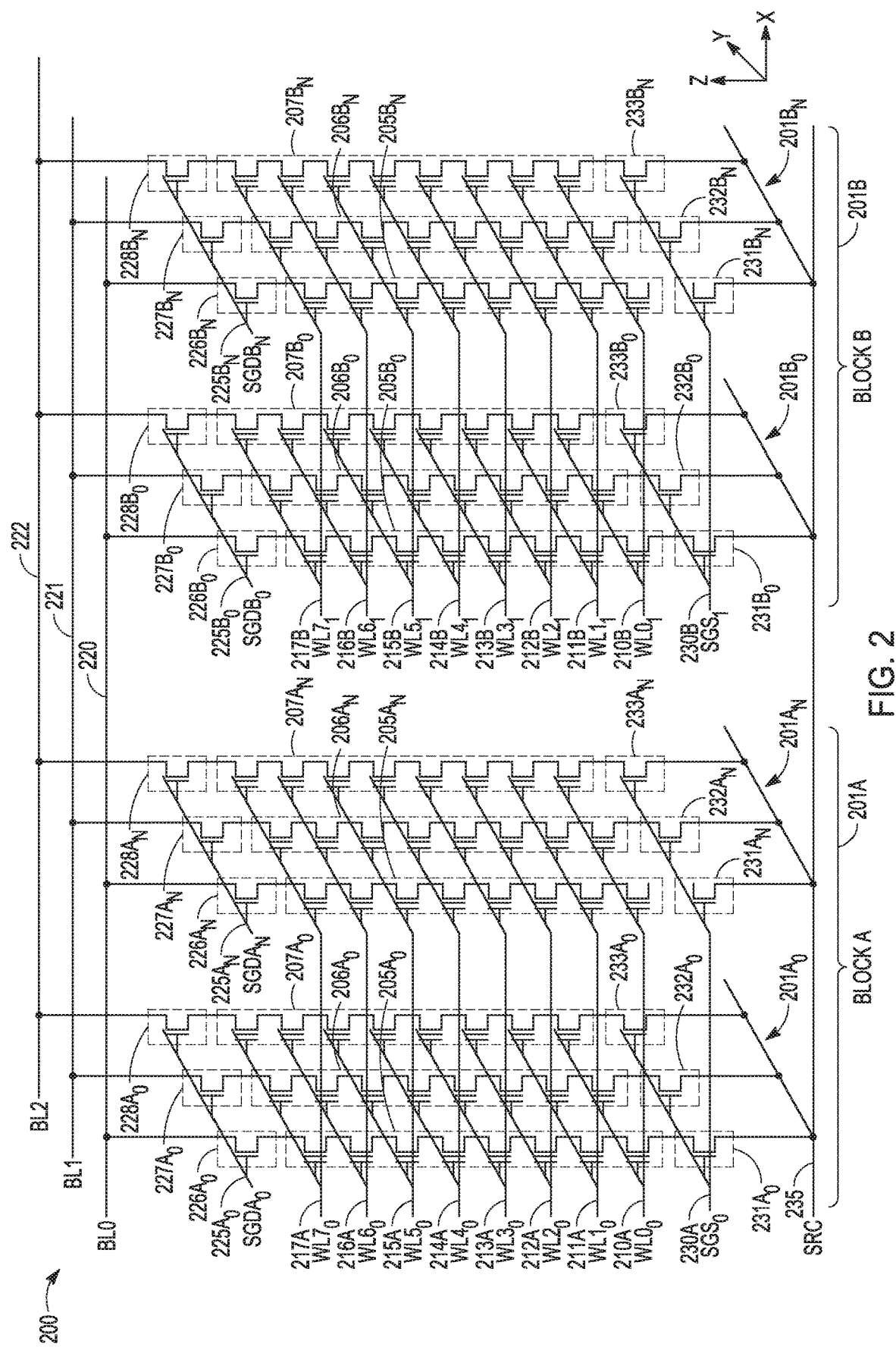
FIGS. 2 and 3 illustrate schematic diagrams of an example of a three-dimensional NAND architecture semiconductor memory array, in accordance with various embodiments.

FIG. 2 illustrates an example schematic diagram of a 3D NAND architecture semiconductor memory array 200 including a number of strings of memory cells (e.g., first-third $A_0$ memory strings 205$A_0$-207$A_0$, first-third $A_n$ memory strings 205$A_n$-207$A_n$, first-third $B_0$ memory strings 205$B_0$-207$B_0$, first-third $B_n$ memory strings 205$B_n$-207$B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$201$B_0$, sub-block $B_n$ 201$B_n$, etc.). The memory array 200 represents a portion of a greater number of similar structures than would typically be found in a block, device, or other unit of a memory device.

Each string of memory cells includes a number of tiers of charge storage transistors (e.g., floating gate transistors, charge-trapping structures, etc.) stacked in the Z direction, between a source line (SRC) 235 or a source-side select gate (SGS) (e.g., first-third $A_0$ SGS 231$A_0$-233$A_0$, first-third $A_n$ SGS 231$A_n$-233$A_n$, first-third $B_0$ SGS 231$B_0$-233$B_0$, first-third $B_n$ SGS 231$B_n$-233$B_n$, etc.) and a drain-side select gate (SGD) (e.g., first-third $A_0$ SGD 226$A_0$-228$A_0$, first-third $A_n$ SGD 226$A_n$-228$A_n$, first-third $B_0$ SGD 226$B_0$-228$B_0$, first-third $B_n$ SGD 226$B_n$-228$B_n$, etc.). Each string of memory cells in the 3D memory array 200 can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD 226$A_0$-228$A_0$ can be accessed using an $A_0$ SGD line SGD $A_0$ 225$A_0$, first-third $A_n$ SGD $226A_n$-$228A_n$ can be accessed using an $A_n$ SGD line SGD $A_n$ $225A_n$, first-third $B_0$ SGD $226B_0$-$228B_0$ can be accessed using an $B_0$ SGD line SGD $B_0$ $225B_0$, and first-third $B_n$ SGD $226B_n$-$228B_n$ can be accessed using an $B_n$ SGD line SGD $B_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
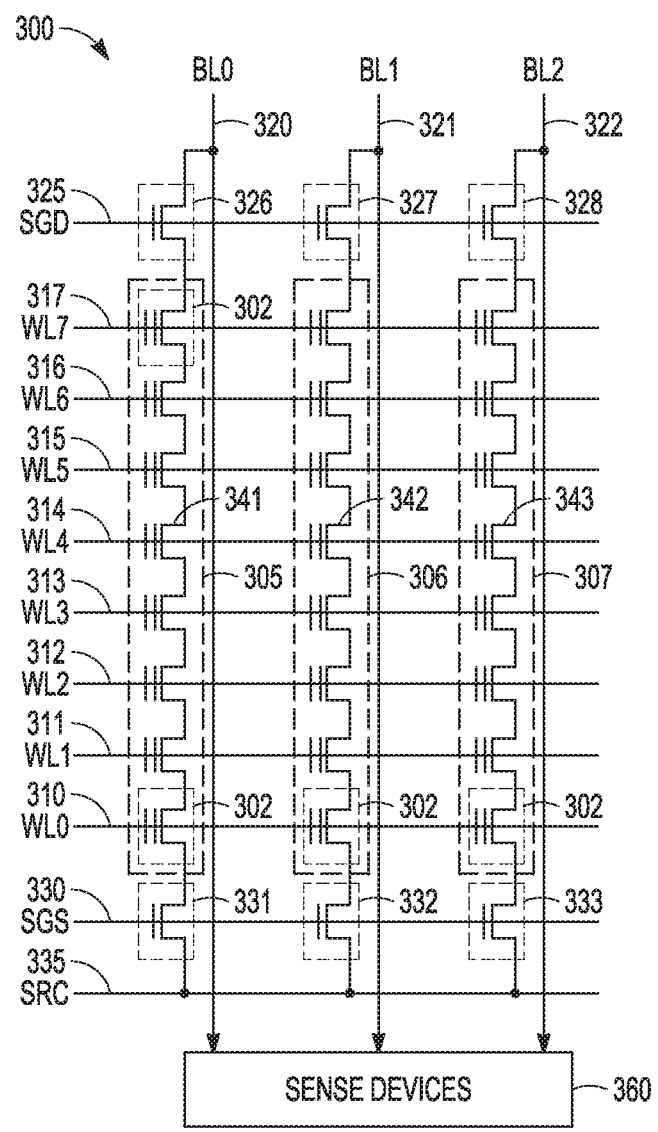

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell 302. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell 302, a programming voltage (Vpgm) (e.g., one or more programming pulses, etc.) can be applied to selected word lines (e.g., WL4), and thus, to a control gate of each memory cell 302 coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense devices 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
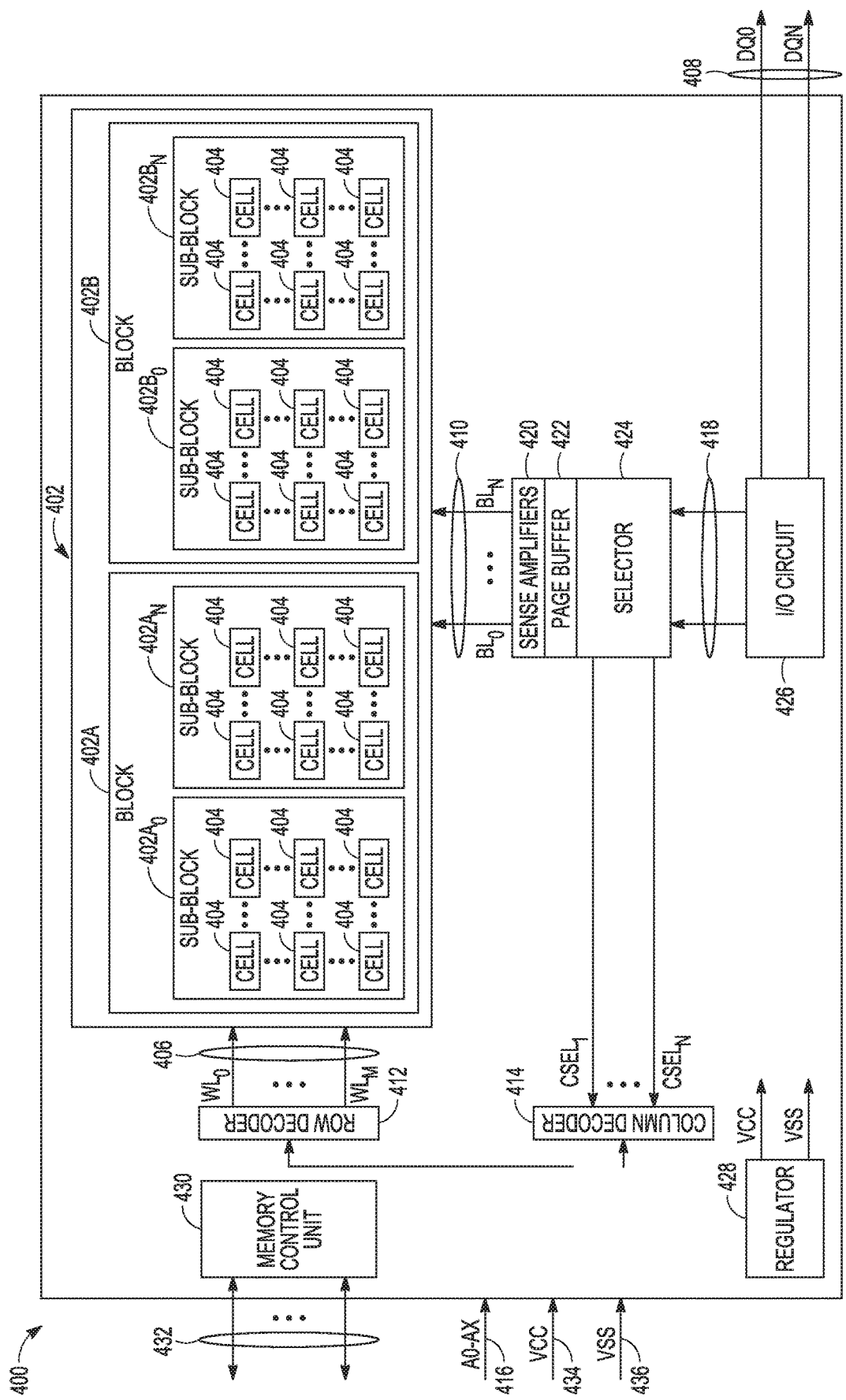
FIG. 4 illustrates an example block diagram of a memory module, in accordance with various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. in other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402 or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
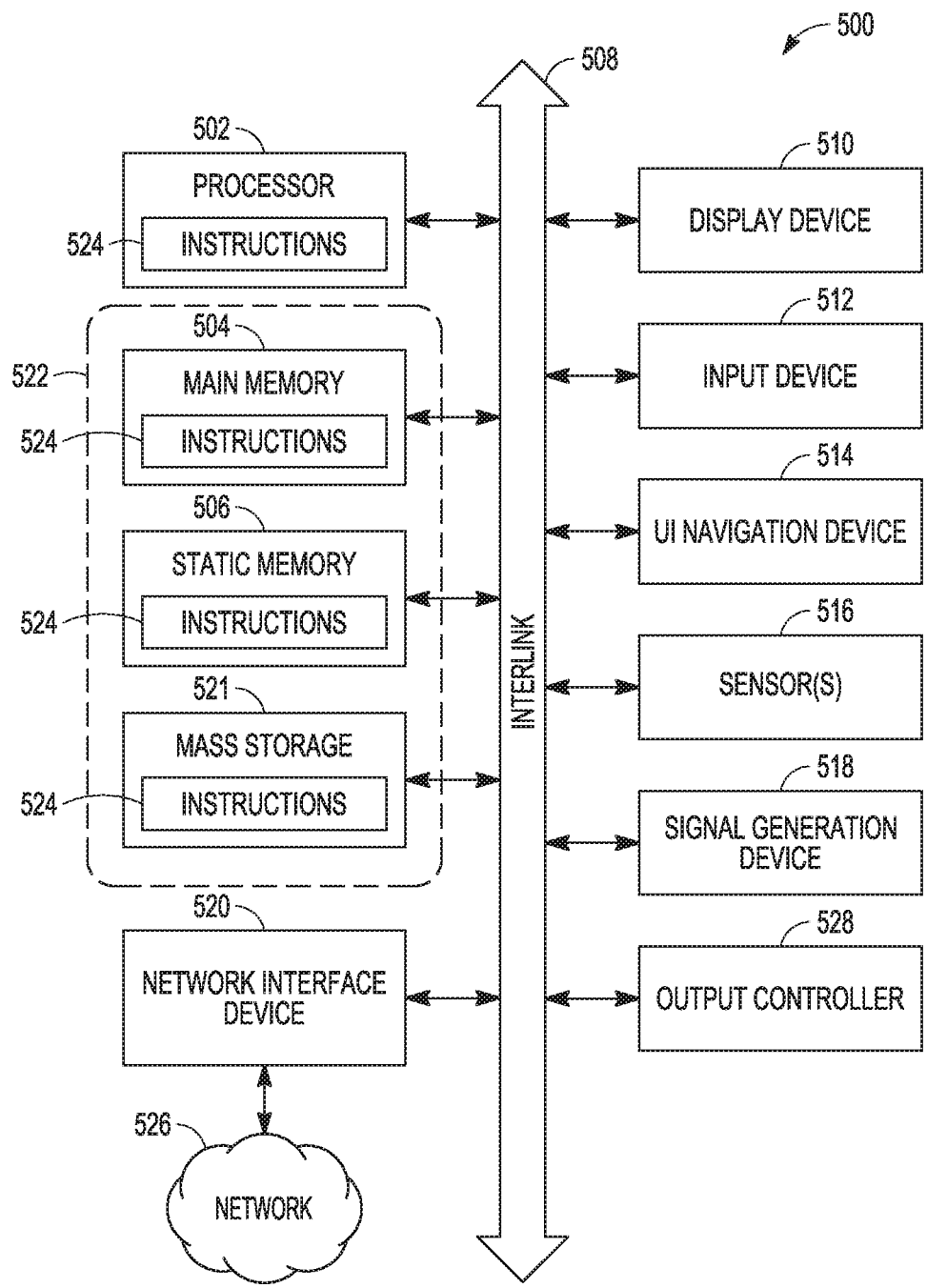
FIG. 5 is a block diagram illustrating an example of a machine upon which one or more embodiments may be implemented, in accordance with various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (CPU), a hardware processor core, or any combination thereof, such as the memory processing device 115, etc.), a main memory 504 and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine-readable medium 522.

While the machine-readable medium 522 is illustrated as a single medium, the term "machine-readable medium" may include a single medium or multiple media (e.g., a centralized or distributed database, or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage device 521 is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid, paging to the storage device 521. Paging can take place in the compressed block until it is time to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to frilly enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission signal" shall be taken to include any signal that is capable of storing, encoding, or carrying instructions for execution by the machine 500, and includes digital or analog communications signals or other signals to facilitate communication of such software.

Figure 6:
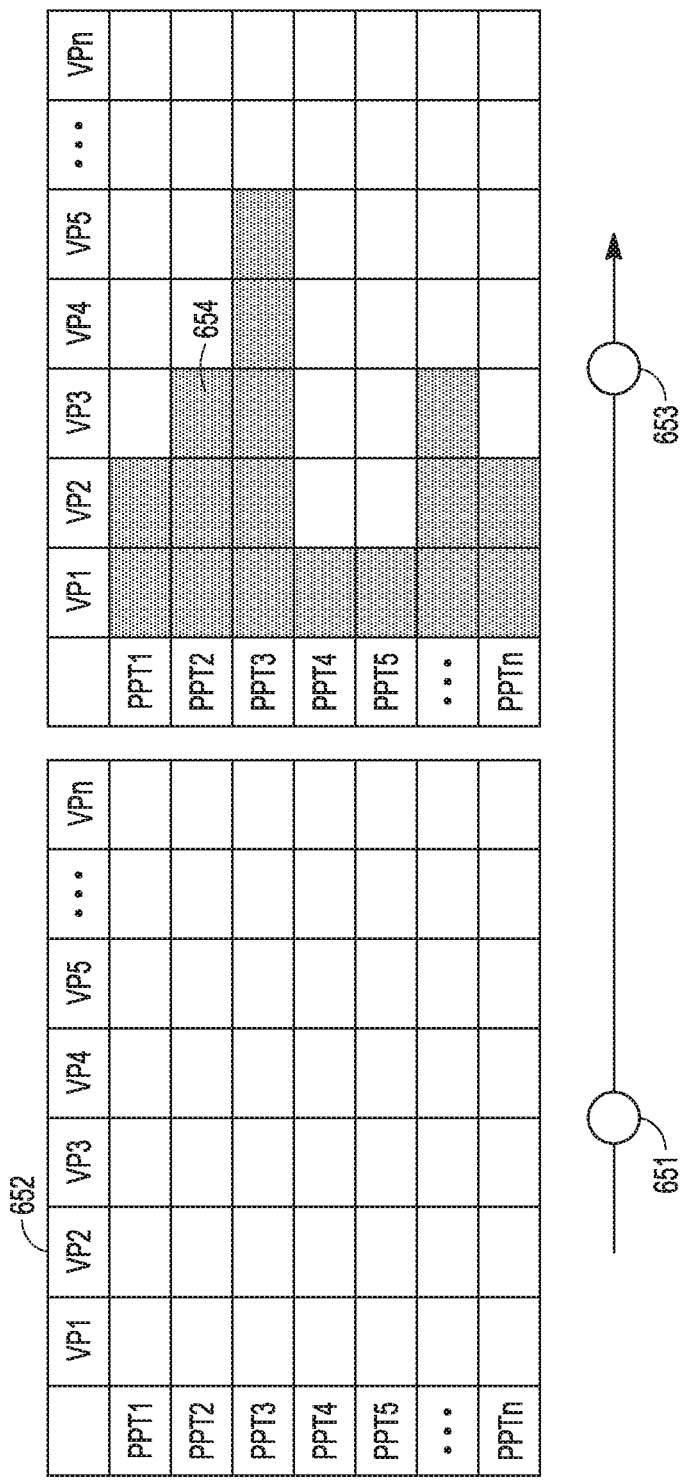
FIG. 6 is an illustration of an allocation of a changelog area starting from a fixed geometry evolving to a variable geometry based on a real memory occupancy, in accordance with various embodiments.

FIG. 6 is an illustration of an allocation of a changelog area starting from a fixed geometry evolving to a variable geometry based on a real memory occupancy. The fixed allocation, which is a virtual allocation, can cover all the memory devices associated with changelog, for example, all managed memory devices on a card. The variable geometry allocation is a real allocation that depends on usage model. At a first time, at 651, the changearea allocation 652 can be seen as a table of n x n elements, where each element is a correspondence of a physical address with a VP. It appears as a simple table where each row intercepts a specific page pointer table (PPT). A PPT is an array that includes a number of physical addresses. Each row of the table 652 is virtually dimensioned for how many VPs that are capable of being tracked on the same value for the respective row. The term virtual is used for expressing a potential value not actually allocated, only a small chunk of memory is actually allocated. In this example, for n number of PPTs, each PPT can include physical addresses for n VPs. During changelog update, the geometry of the table can be changed, adapting it to the remaining memory assuming a new structure where the virtual size of each row is dynamically reassigned. This reassignment happens each time a PPT is intercepted. In the example shown, at 653, the shaded entries show a real allocated memory 654 with respect to the allocation of a global indexing schema of table 652 to address the memory devices associated with the changelog.

When the real allocated memory consumes all available memory for a changelog, an update checkpoint can be triggered. A checkpoint occurs when the L2P changelog becomes frill and the checkpoint procedure can include loading all the PPTs that are in the L2P changelog into an L2P cache in order to update PPTs and then flush (store) the modified PPTs into a memory device, for example, a NAND memory device. A system can be configured, upon determination that the allocated amount of memory space is used by the changelog, to trigger a procedure to load PPTs from a NAND memory device to a RAM, update the PPTs in the RAM, and flush the PPTs from the RAM to the NAND memory device. The checkpoint operation can be a time consuming operation.

In an approach for dynamic scaling for a changelog in a storage device, the size of the memory area, where the dynamic changelog table can be allocated, can be fixed with the maximum number of entries equal to e for each addressable PPI. The max number of PPTs addressable in the changelog can be fixed as the maximum number of table rows equal to r. A PPT bitmap can be generated with respect to the r rows. A bitmap is a mapping from a domain to a number of bits, which provides a representation of information regarding items of the domain. A PPT bitmap is an array having a bit (storage location) for each addressable PPT for the managed memory device. A bit, at a location in the bitmap for a PPT addressed, having a value of zero for the PPT can identify that the PPI addressed is not stored in the changelog, and the bit having a value of one for the PPT can identify that the PPT addressed is stored in the changelog. Alternatively, the bit values of one and zero can provide reversed identifications. In an embodiment, a single (one) PPT bitmap can be used. However, multiple PPT bitmaps can be implemented for a changelog.

For each specific PPT, a VP bitmap can be generated. A VP bitmap includes a bit for each VP corresponding to the specific PPT. There can be r VP bitmaps, one for each row (PPT). A dynamic linked list for the PPTs can be generated with a maximum number of nodes equal to r. A dynamic linked list associated with VPs for each of these PPT nodes can be generated with each such dynamic linked list having a maximum number of nodes equal to e. One or more hardware accelerators can be implemented, where each hardware accelerator is able to count how many bits are asserted inside a memory range (a sequence of bytes). The memory range can include the range of bit locations in the PPT bitmap or the range of bit locations in the VP bitmaps.

In the allocation for the dynamic scaling for the changelog, as noted above, how many entries the changelog table can contain for each PPT (e=entries count) is defined. Each entry in a row identifies an index for a VP. The changelog is seen as a dynamic table where each row is an entry point for a specific PPT, and each column is a specific VP index for the specific PPT. The table can dynamically change its structure with a variable number of rows, where each row can have a variable number of columns. The dynamic table structure can change within two limit cases. One limit case is based on a full sequential write transaction, on a single PPT, that causes a table with one row and a number of columns equal to e if e is less than or equal to the PPT size in term of VPs. The second limit case is based on a full random write transaction, on different PPTs, that causes a table with e rows, if e is less than or equal to the to the PPT count inside the memory device size, where each row has a single column.

Figure 7:
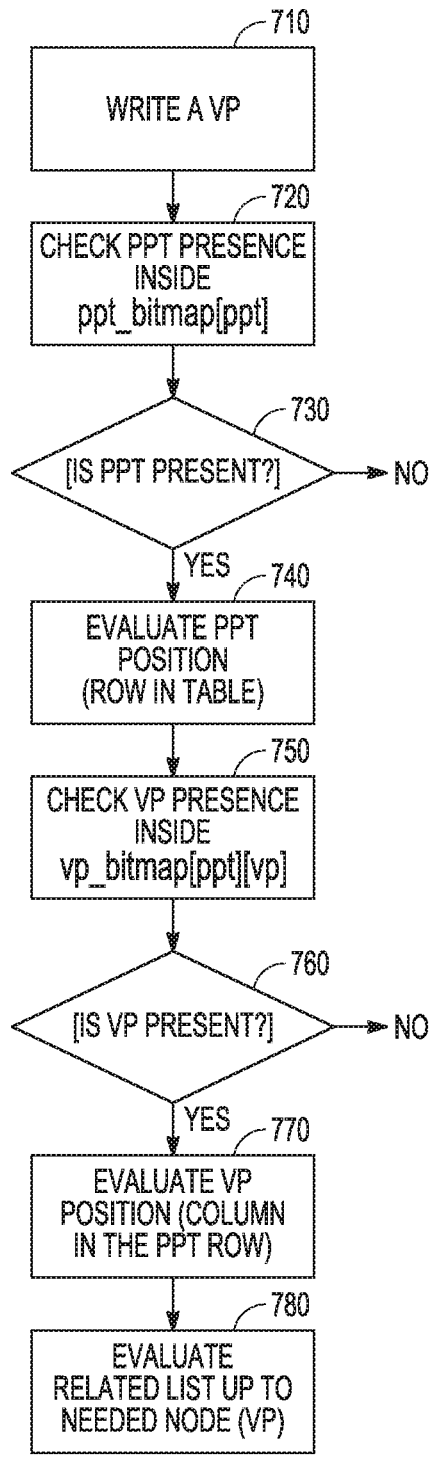
FIG. 7 is a flow diagram of an example procedure of accessing a changelog for writing at a virtual page address, in accordance with various embodiments.

The changelog can be seen as a two-dimensional vector changelog of [rows] and [columns]. The rows can correspond to PPI s and the columns to VPs. The changelog can be accessed for enqueueing, overwriting, and reading the same VP. All access types can perform the same steps. FIG. 7 is a flow diagram of an embodiment of an example procedure of accessing a changelog for writing at a VP. At 710, a VP is used as an entry to the changelog for a write operation by using an index for the VP. At 720, the index is used to check for a PPT presence in the PPT bitmap. At 730, a determination is made as to whether the PPT is present. Upon determination that the PPT is present in the PPT bitmap, at 740, the position of the PPT (row in the table) is evaluated. This evaluation can be conducted by making a bit count before the related PPT bit position inside the PPT bitmap. At 750, a check for VP presence inside the VP bitmap can be made. At 760, a determination is made as to whether the VP is present. Upon determination that the VP is present in the VP bitmap, at 770, the position of the VP (column in the table) is evaluated. This evaluation can be conducted by making a bit count before the related VP bit position inside the VP bitmap. At 780, a related list can be navigated up to the desired VP node. The write action can be made on the addressed VP from the information at the desired VP node. As noted above, this procedure can be used to make a read operation, or other operation, on the addressed VP.

Figure 8:
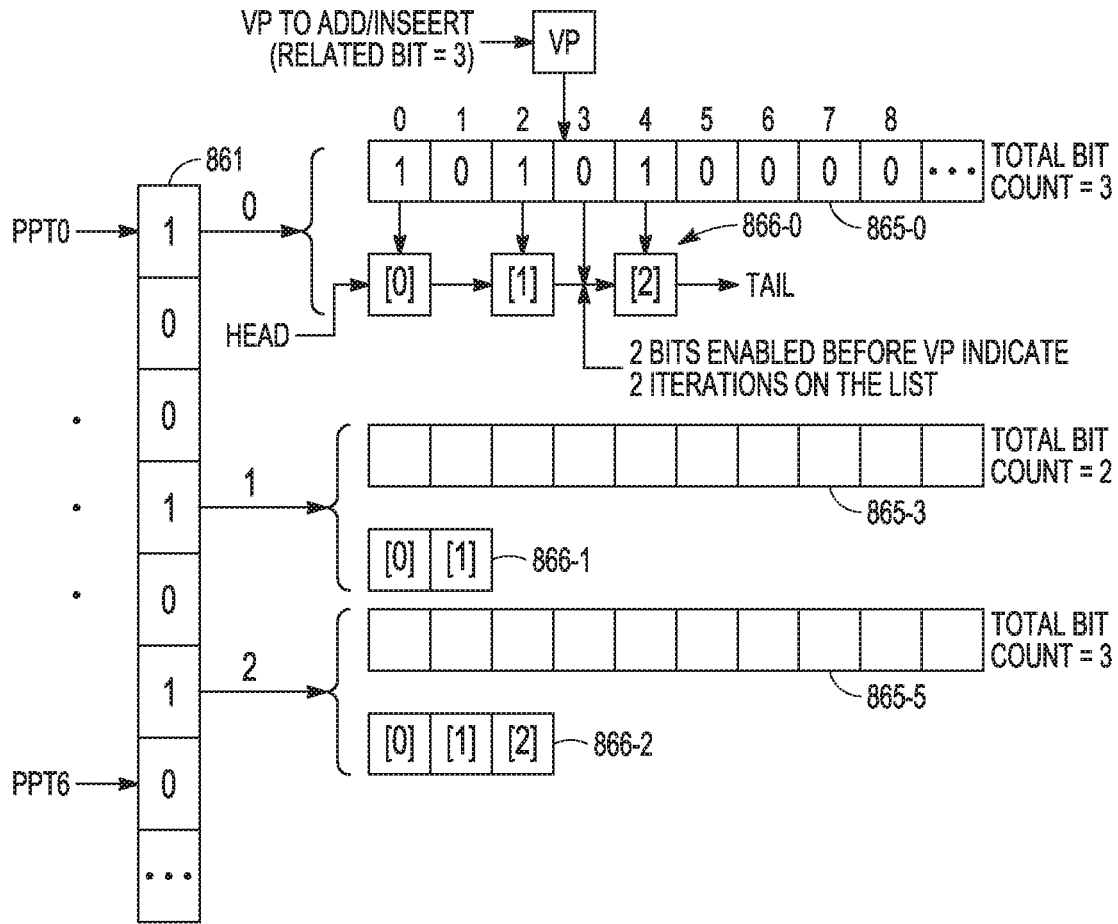
FIG. 8 is an illustration of an example operation that effectively adds a virtual page address to a changelog data structure, in accordance with various embodiments.

FIG. 8 is an illustration of an embodiment of an example operation that effectively adds a VP to a changelog data structure. In this example, a VP is to be added that is related bit 3 of a VP bitmap for specific PPT that is PPT0 in a PPT bitmap 861. The PPT bitmap 861 is shown having entries for PPT0, PPT1, PPT2, PPT3, PPT4, PPT5, and PPT6 with an indication that PPT bitmap 861 can have more locations for more PPTs. A one bit is in each of the locations for PPT0, PPT3, and PPT5, indicating the presence of PPT0, PPT3, and PPT5 in the changelog. A zero bit in each of the locations for PPT1, PPT2, PPT4, and PPT6 indicates the absence of PPT1, PTT2, PPT4, and PPT6 in the changelog. Also shown are VP bitmaps 865-0, 865-3, and 865-5 for addressable PPT0, PPT3, and PPT5, respectively. The numbers 0, 1, 2, 3, 4, 5, 6, 7, 8 above VP bitmap 865-0 are VP index positions in each of the VP bitmaps. Next to PPT bitmap position 0 is a 0. Next to PPT bitmap position 3 is a 1 and next to PPT bitmap position 5 is a 2. These numbers, 0, 1, and 2, identify that PPT0, PPT3, and PPT5 are in a linked PPT list of PPTs in the changelog, where PPT0 is in the (first) position of the PPT list, PPT3 is in the 1 (second) position of the PPT list, and PPT5 is in the 2 (third) position of the PPT Corresponding to the $0^{th}$ (first) position of the PPT first is a linked VP list 866-0 shown as having three nodes [0], [1], and [2] at a time before the VP related to bit 3 is added by an insertion process.

In this example, VP bitmap 865-0 has a one asserted in index positions 0, 2, and 4 of VP bitmap 865-0 for a total bit count equal to three. The asserted ones indicate presence of associated VPs corresponding to PPT0. The asserted ones indicate presence of associated VPs corresponding to PPT0. The asserted bits in bitmap 865-0 are mapped to the three nodes [0], [1], and [2] of the linked VP list 866-0. VP bitmap 865-3 has a total bit count equal to two asserted ones, indicating presence of associated VPs corresponding to PPT3. The two asserted bits in bitmap 865-3 are mapped to the two nodes [0] and [1] of the linked VP list 866-1. VP bitmap 865-5 has a total bit count equal to three asserted ones, indicating presence of associated VPs corresponding to PPT5. The three asserted bits in bitmap 865-3 are mapped to the three nodes [0], [1], and [2] of the linked VP list 866-2.

When the VP is added to VP bitmap 865-0 at VP index position 3, the VP index position 3 will be asserted by changing the zero, present before adding the VP, to a one. The number of bits asserted (set to one) in VP bitmap 865-0 before the added VP at index position 3 are counted, where these counted asserted bits correspond to nodes in the linked VP list 866-0. The count, in this example, results in a determination that 2 bits are enabled before the index position 3 at which the VP is added, which indicates two iterations on the VP list 866-0. Two iterations means that a node, for the added VP, is inserted in the VP list 866-0 after the first two nodes currently in the VP list 866-0 from the head end of VP list 866-0. Iteration is a navigation or moving in a list to a wanted node. Alternatively, the count can be made from the tail of VP list 866-0. Choice of which end to count from can depend on the VP index to which a VP element is being added and the number of index positions of VP bitmap 865-0. Node [2] of the VP list becomes node [3] of the VP list 866-0 with the insert of the node related to VP index 3 of bitmap 865-0 as node [2] of the VP list 866-0.

The list navigation of a VP list, for example VP list 866-0, 866-3, or 866-5, can be performed from the head of the list of the tail of the list. The shorter of the two routes may be preferred. The maximum number of list iterations to access to a changelog element in this approach is the count of VPs for the given PPT divided by two. Based on the node position, one can choose to navigate the list from the head or tail of the list, in which case, the worst case is the maximum-list-size divided by two, where the maximum-list-size is the number of VPs contained in a PPT, which can be written as (VP_count_for_PPT).

In an approach, as taught herein, it is sufficient to store only physical address, without storing a pair of pair information about L2P translation in the changelog. Such a changelog is accessible using a direct indexing. In addition, the changelog structured using bitmaps can support VP direct overwriting, removing, and adding. Further, since the VP element is being updated in a data transaction, storing of the L2P history of the VP can be avoided, which reduces the amount of data storage being used.

For an example of a 256 GB data memory device, the amount of storage used for a changelog in a storage device, for example a RAM, can include 8 KB for a PPT bitmap and 128 B for a VP bitmap with a changelog element size of 4 B. In the case of 256 PPTs, 256 VP bitmaps can be addressed, one VP bitmap for each PPT, using approximately 32 KB. For the changelog allocation size for 4096 elements, the storage size is approximately 16 KB. For this example, the amount of storage used for a changelog in the storage device adds to approximately 32 KB+16 KB+8 KB=56 KB.

To implement an approach for a changelog using bitmaps and indexing, counting of bits before a related PPT bit position inside the PPT bitmap and before the related VP bit position inside the VP bitmap can be realized by one or more hardware accelerators. A hardware accelerator can be implemented to count how many bits are asserted inside a memory range (a sequence of words). The counting can be truncated on a particular test bit. Such a hardware accelerator can be implemented to check whether a particular test bit is asserted inside a memory range (a sequence of words). A particular test bit is a current bit of interest. Each hardware accelerator can have a number of registers. The registers can include a start_addr register to hold a start memory address, a words register to identify how many words to iterate for counting, and a direction register to identify an iteration direction. The start_addr register can be a thirty-two bit register or other appropriate size register. The words register can be a thirty-two bit register or other appropriate size register. The direction register can be a one bit register. The start_addr+ words indicates how many bits are asserted before the test bit. The start_addr+words indicates how many bits are asserted after the test bit.

The registers of a hardware accelerator can also include a test_bit_pos register, a bits_count register, a test_bit_state register, an enable_check register, and a check_complete register. The contents of the test_bit_pos register can indicate on which bit inside the memory range the counting is to be truncated. It can be used to know how many bits are asserted (bit count) before or after the indicated test bit. The test bit is intended, as absolute in the range of (start_addr+ words). The test_bit_pos register can be a thirty-two bit register or other appropriate size register. The bits_count register can hold the result of the bits count. The bits_count register can be a thirty-two bit register or other appropriate size register. The test_bit_state register can hold the check result on the test bit as asserted or not asserted. The test_bit_state register can be a one bit register or other appropriate size register. The enable_check register can hold an indicator that, when asserted, starts the bits counting and checks whether the test bit is asserted. It can be used to reset the indicator in the check_complete register. The enable_check register can be a one bit register or other appropriate size register. The contents of the check_complete register can indicate when the counting is complete. When asserted, it can be used to reset the indicator in the enable_check register. The check_complete register can be a one bit register or other appropriate size register.

An approach to using a changelog index scheme can include operations to access a virtual table with X rows and Y columns, with a maximum count of items equal to X*Y (* being a multiplication operator), using less memory.

Since in the real condition or operating environment, the virtual table probably may never be full, the allocation schema, as taught herein, allows use of a reduced memory area for the virtual table, ensuring a direct access to a table item. This access can be accomplished using, instead of two coordinates (X and Y), four coordinates—two standard coordinates (X and Y) and two sequential coordinates (Sx and Sy).

Using the first two coordinates X and Y as positions inside a x_bitmap and a y_bitmap, respectively, the presence of a desired item in the table can be checked. The check can be accomplished with a determination that correspondent bit in a related position in the appropriate bit is asserted, where assertion can correspond to the respective bit location containing a one. In an alternative logic approach, assertion can correspond to the respective bit location containing a zero. With the table items stored in some linked lists, where each list is seen as a row and each node is seen as column, the sequential coordinates coincide with how many bit are asserted in the x_bitmap and y_bitmap before bit X and bit Y. An example is illustrated in FIG. 9.

Figure 9:
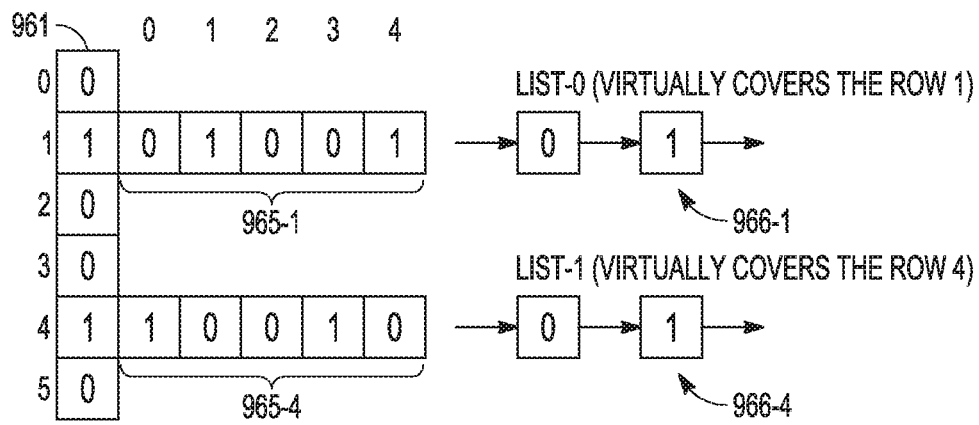
FIG. 9 is an illustration of example bitmaps and linked lists associated with a virtual table that can represent a table having elements correlating virtual page address elements to page pointer tables, in accordance with various embodiments.

FIG. 9 is an illustration of an embodiment of example bitmaps and linked lists associated with a virtual table that can represent a table having elements correlating VP elements to PPTs. The virtual table, not shown, has six rows and five columns where allocation of elements can have 6*5=30 items. In FIG. 9, there is one bitmap 961 shown as one column having six rows, where the six rows can be indexed sequentially from top to bottom as 0, 1, 2, 3, 4, and 5. The bitmap 961 can correspond to a PPT bitmap associated with six PPTs with the six PPTs being labelled as PPT0, PPT1, PPT2, PPT3, PPT4, and PPT5 in a one to one correspondence with row indexes 0, 1, 2, 3, 4, and 5. In this example, the row of bitmap 961 indexed as 1 corresponds to a bitmap 965-1 and the row of bitmap 961 indexed as 4 corresponds to a bitmap 965-4, where each of the bitmap 965-1 and the bitmap 965-4 is a row having five columns indexed as 0, 1, 2, 3, and 4. The bitmap 965-1 can correspond to a VP bitmap for PPT1 and the bitmap 965-4 can correspond to a VP bitmap for PPT4.

Consider the case for the real allocation of four items (item 1, item 2, item 3, and item 4) as shown as asserted ones in the bitmap 965-1 and the bitmap 965-4. Since there is no real allocation of other items associated with the bitmap 961, the only bitmaps allocated as rows are the bitmap 965-1 and the bitmap 965-4. Item 1 is allocated for row 1 of the bitmap 961 with a one assert in column 1 of the bitmap 965-1. Item 2 is allocated for row 1 of the bitmap 961 with a one asserted in column 4 of the bitmap 965-1. Item 3 is allocated for row 4 of the bitmap 961 with a one assert in column 0 of bitmap 965-3. Item 4 is allocated for row 4 of the bitmap 961 with a one assert in column 3 of bitmap 965-3. The other positions of in the bitmap 965-1 and the bitmap 965-4 contain zeros as there are only four items allocated in this example. There are two lists 966-1 and 966-3 linked to the bitmap 965-1 and the bitmap 965-4, respectively. Linked list 966-1 contains only two elements defined by the positions in the bitmap 965-1 that have a one asserted. Position zero of linked list 966-1 is a node containing information for item 1 corresponding to column 1 of the bitmap 965-1 that is correlated to position 1 of the bitmap 961, and position one of linked list 966-1 is a node containing information for item 2 corresponding to column 4 of the bitmap 965-1 that is correlated to position 4 of the bitmap 961. Position zero of linked list 966-4 is a node containing information for item 3 corresponding to column 0 of the bitmap 965-4 that is correlated to position 4 of the bitmap 961, and position one of linked list 966-4 is a node containing information for item 4 corresponding to column 3 of the bitmap 965-4 that is correlated to position 4 of the bitmap 961. Though the associated virtual table corresponds to allocation for thirty items, the use of bitmaps and linked lists allows for the allocation of items being considered, which in this example is four items.

FIGS. 10A-10D illustrate an example of implementing a changelog indexing scheme that can reduce memory area used for a changelog. For ease of discussion, a changelog for a small memory is represented in these figures. In this example, the virtual page size is 4096 bytes (each VP referred to as 4 kB) for a device memory size of 20 VPs (40962*0=81900 bytes, which is referred to as 80 kB). The number of physical page tables (PPTs) is set equal to four, where each PPT can address five VPs. The four PPI s can be labelled as PPT0, PPT1, PPT2, and PPT3, PPT0 can address VP elements from VP0 to VP4. PPT1 can address VP elements from VP5 to VP9. PPT2 can address VP elements from VP10 to VP14. PPT3 can address VP elements from VP15 to VP19. Each of VP0, VP1, VP2, VP3, VP4, VP5, VP6, VP7, VP8, VP9, VP10, VP11, VP12, VP13, VP14, VP15, VP16, VP17, VP18, an VP19 includes an absolute index of the respective VP inside the memory area. For example, for VP8, 8 is the absolute index of the respective VP inside the memory area.

FIG. 10A shows a global changelog table 1055 in a storage device. The storage device can be realized as RAM. The global changelog table (GCT) 1055 is able to represent the whole memory area addressable using two spatial coordinates Y for rows corresponding to PPIs and X for columns corresponding to VPs, where the VPs are arranged in PPTs. However, this type of the representation has shortcomings with respect to memory used in the storage device for the changelog. For example, a memory of 512 GB with VP size=4096 bytes uses 134,217,728 cells in the GCT 1055, where each cell contains a 32 bit physical address of a location in which the VP is remapped. In this case, a RAM to address the whole device memory should be approximately 512 MB. This size of memory used in the RAM provides impetus to generate a different addressing schema. In various embodiments, the same result for effectively obtaining information relating a VP to PPT can be accomplished using less RAM by using four coordinates instead of the canonical two coordinates, Y and X. The two spatial coordinates (Y and X) are used to check VP presence in the bitmaps for accessing the changelog. Two temporal or sequential coordinates (Sy and Sx) can be used to navigate a linked list to reach the wanted VP node (cell). The GCT 1055, in this example, includes rows indexed 0 to 3 to correspond to PPTs given by PPT0, PPT1, PPT2, and PPT3, respectively. Each row of the global changelog table 1055 has five columns indexed 0 to 4 for VPs.

FIG. 10B shows a sequence of write commands 1058 issued by a host, where all VPs can be seen to intercept rows in the GCT of FIG. 10A. The host device write sequence includes generation of absolute VP indices VP0, VP5, VP3, VP19, VP8, VP6, VP8 that are within a sequence of consecutive numbers from 0 to a number representing the total of the number of possible VPs. In the write sequence 1058, VP0 and VP3 can be seen to belong to PPT0 of GCT 1055; VP5, VP6 and VP8 can be seen to belong to PPT0 of GCT 1055; and VP19 can be seen to belong to PPT3 of GCT 1055. The last element in the write sequence 1058 of VPs is another write operation with respect to VP8.

FIGS. 10C and 10D illustrate an embodiment of an example changelog representation in RAM. This representation occupies less space in the RAM than the GCT 1055. FIG. 10C shows an embodiment of an example manner in which bitmaps can be arranged in the changelog for spatial coordinates. Bitmap 1061 is a PPT bitmap 1061. The Y coordinate is the PPT of the wanted VP, where the Y coordinate is indexed with integers from 0 to 3. The related bit state in each location of the PPT bitmap 1061 has one of two states. A value of zero in a bit location of the PPT bitmap 1061 can be used to mean that the PPT addressed by a given Y coordinate is not stored in the changelog. A value of one in a bit location of the PPT bitmap 1061 can be used to mean that the PPT addressed by a given Y coordinate is stored in the changelog. Depending on the logic used, the roles of a zero and a one for presence of a PPT can be reversed.

Associated with each Y coordinate, there is a VP bitmap. Y coordinates 0, 1, 2, and 3 are correlated to VP bitmap 1065-0, VP bitmap 1065-1, VP bitmap 1065-2, and VP bitmap 1065-3, respectively. The X coordinate, from 0 to 4 in this example, for each VP bitmap is the VP index inside the related PPT. A value of zero in a bit location of a VP bitmap of the four bitmaps can be used to mean that the VP addressed by a given X coordinate is not stored in the changelog. A value of one in a bit location of a VP bitmap of the four bitmaps can be used to mean that the VP addressed by a given X coordinate is stored in the changelog. Depending on the logic used, the roles of a zero and a one for presence of a VP can be reversed. As shown in FIG. 10C, a one in location zero of VP bitmap 1065-0; a one in location three of VP bitmap 1065-0; a one in location zero of VP bitmap 1065-1; a one in location one of VP bitmap 1065-1; a one in location three of VP bitmap 1065-1; and a one in location four of VP bitmap 1065-3 identify the presence of VP0, VP3, VP0, VP6, VP8, and VP19 in the changelog, where their presence corresponds to the previous write sequence 1058 by a host, as shown in FIG. 10B.

FIG. 10D shows an embodiment of an example manner in which linked lists are arranged in the changelog for temporal coordinates. A list 1064 is linked to the PPT bitmap 1061. Link list 1064 is a PPT linked list, where PPT linked list 1064 contains only the PPTs stored in the changelog. In the example of FIG. 10B and FIG. 10C, there are only three nodes in the PPT linked list 1064, corresponding to the asserted ones in the PPT bitmap 1061 of FIG. 10C. For each PPT in the PPT linked list 1064, there is a VP linked list. For PPT0 in PPT linked list 1064, there is VP linked list 1066-0. For PPT1 in PPT linked list 1064, there is VP linked list 1066-1. For PPT3 in PPT linked list 1064, there is VP linked list 1066-3. For each linked list, there is a head end and a tail end from which the linked lists can be navigated to find a desired VP of a host generated operation.

Consider the following example algorithm for searching and updating a VP inside a changelog. An algorithm is a sequence of actions or stages to attain a specified goal. In this example, VP8 is being updated, where VP8 is the last VP in the write sequence 1058 of VPs by a host as shown in FIG. 10B, using bitmaps, lists linked to the bitmaps, and a counter of bits asserted in the bitmaps. The bitmaps and linked lists are discussed below with respect to FIGS. 10C and 10D. As noted above for the VP8 in this example, 8 is the absolute index of the VP8 inside memory area. At stage 1, the associated spatial Y coordinate of the bit related to the PPT corresponding to VP8 can be evaluated, where the spatial Y coordinate in this example is one of 0 to 5 identifying a specific bit location in PPI bitmap 1061. This evaluation can be performed by making an integer division of the VP absolute index by the PPT size. For VP8, the related PPT bit in bitmap 1061, using the integer division approach, is given by:

PPT bit=int(VP absolute index/PPT size)=8/5=1

With the Y coordinate being 1 for the one location in the PPT bitmap 1061, the VP8 is in PPT1.

At stage 2, the state of the related bit in the PPT bitmap, such as PPT bitmap 1061, is checked. If the related bit from the integer division in the PPT bitmap 1061 is asserted, set equal to one, then the related PPT is stored in the changelog. As seen in FIG. 10C, the value of the Y coordinate, which is the location 1 in the PPT bitmap 1061, is one, so PPT1 is stored in the change log for this example.

At stage 3, the temporal Y coordinate of the node in the PPT list 1064 (its position) is evaluated by counting how many bits are asserted in the PEI bitmap 1061 before the wanted bit. In this example, the spatial Y coordinate is bit one in the PPT bitmap 1061. Before the bit one location in the PPT bitmap 1061, there is only one asserted bit, which is a one in bit zero location in the PPT bitmap 1061 corresponding to PPT0. PPT0 is the first node from the head end in the PPT list 1064, where the PPT list 1064 lists each PPT in which its corresponding location in the PPT bitmap 1061 is asserted. So, in this example, the wanted PPI node is the second node in the PPT list 1064. This stage includes navigating the PPT linked list 1064 up to second node in the PPT linked list 1064. This node contains a pointer to the VP linked list related to PPT1.

At stage 4, the spatial X coordinate of the bit (location), in a VP bitmap correlated to the determined PPT, related to wanted VP is evaluated. This bit location is a VP index within a VP bitmap. The evaluation can be performed by executing a modulo operation of the VP absolute index with respect to the PPT size (the symbol for a modulo operation is also given herein as %). In this example, the VP index for VP8 can be given by:

VP index=(VP absolute index) mod(PPT size)=8% 5=3, where 3 is the relative VP Index of VP8 in the determined PPT. In this example, the wanted VP8 for updating as a VP index of three identifying that the VP8 is related to the position three in a VP bitmap (In this example, the VP bitmaps have five positions indexed from zero to four such that position three is the fourth location of a bitmap). Since the related PPT has been determined to be PPT1, the wanted VP8 is associated with position three of VP bitmap 1065-1 shown in FIG. 10C.

At stage 5, the state of the related bit in the VP bitmap, such as VP bitmap 1065-1 in this example, is checked. If the related bit, which is given by the VP index determined from the modulo operation, is asserted, which is the value at the VP index set equal to one, then the wanted VP with the VP index for the determined PPT is stored inside changelog. As seen FIG. 10C, the value of the VP index, which is the location 3 in the VP bitmap 1065-1, is one, so the wanted VP index is stored inside changelog for this example.

At stage 6, the temporal X coordinate of the node in the VP list 1066-1 (its position) is evaluated by counting how many bits are asserted in the VP bitmap 1065-1, to which VP list 1066-1 is linked, before the wanted bit. In this example, the spatial X coordinate is at the bit three location in the VP bitmap 1065-1. Before the bit three location in the VP bitmap 1065-1 corresponding to PPT1, there are two bits asserted, which are a one in bit zero location in the VP bitmap 1065-1 and a one in bit one location in the VP bitmap

1065-1. So the wanted node is the third node in the VP list 1066-1, which contains the related NAND physical address. This node can be updated with new information about VP8.

The above algorithm has been applied to the example of FIGS. 10A-10D in which the size of the PPTs and number of VPs have been made small for ease of discussion. The above algorithm approach can be applied to memory devices with large allocations for data storage. In addition, various permutations to this algorithmic approach can be made. Use of bitmaps, lists linked to the bitmaps, and a counter of bits asserted in the bitmaps, similar to the teachings herein, can provide for a dynamic reduction in memory usage for changelog operation relative to conventional approaches.

Figure 11:
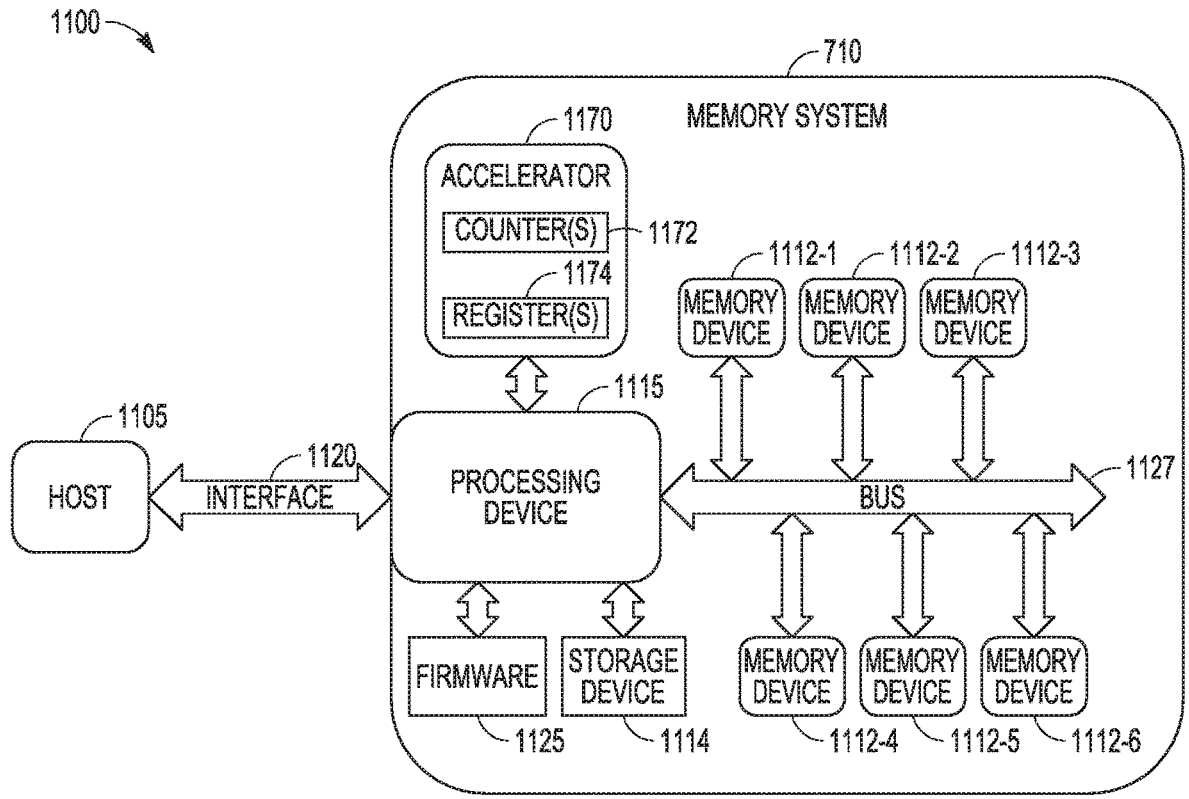
FIG. 11 is a block diagram of an embodiment of example system including a host that operates with a memory system having multiple memory devices and a storage device in which a changelog, implemented to correlate virtual page addresses to physical addresses in one or more of the memory devices, is constructed in the storage device with an allocation schema for a scalable memory area in the storage device, in accordance with various embodiments.

FIG. 11 is a block diagram of an embodiment of example system 1100 including a host 1105 that operates with a memory system 1110 having multiple memory devices and a storage device 1114 in which a changelog, implemented to correlate virtual page addresses to physical addresses in one or more of the memory devices, is constructed in the storage device 1114 with an allocation schema for a scalable memory area in the storage device 1114. The storage device 1114 can be realized as a RAM device. The host 1105 is coupled to the memory system 1110 by an interface 1120. The memory system 1110 can include a processing device 1115 coupled to memory devices 1112-1, 1112-2, 1112-3, 1112-4, 1112-5, and 1112-6 by a bus 1127. The memory devices 1112-1, 1112-2, 1112-3, 1112-4, 1112-5, and 1112-6 may be NAND memory devices. Though six memory devices are shown in FIG. 11, the memory system 1110 can be implemented with less or more than six memory devices, that is memory system 1110 can comprise one or more memory devices. The memory devices can be realized in a number of formats including but not limited to a plurality of memory dies. The processing device 1115 can include or be structured as one or more processors.

The memory system 1100 can comprise firmware 1125 having code executable by the processing device 1115 to at least manage the memory devices 1112-1, 1112-2, 1112-3, 1112-4, 1112-5, and 1112-6. The firmware 1125 can reside in a storage device of the memory system 1110 coupled to the processing device 1115. The firmware 1125 can be coupled to the processing device 1115 using the bus 1127 or some other interface on the memory system 1110. Alternatively, the firmware 1125 can reside in the processing device 1115 or can be distributed in the memory system 1110 with firmware components, such as but not limited to code, including one or more components in the processing device 1115. The firmware 1125 can include code having instructions, executable by the processing device 1115, to operate on the memory devices 1112-1, 1112-2, 1112-3, 1112-4, 1112-5, and 1112-6. The instructions can include instructions to control a memory size of a changelog in the storage device 1114 using bitmaps, lists linked to the bitmaps, and one or more counters of bits asserted in the bitmaps, where the changelog is implemented to correlate virtual page addresses to physical addresses in one or more of the memory devices 1112-1, 1112-2, 1112-3, 1112-4, 1112-5, and 1112-6. The instructions can include instructions to update the changelog using the bitmaps, the lists, and the one or more counters of bits asserted in the bitmaps. The bitmaps, the lists, and the counters can be realized in a manner as taught with respect to FIGS. 6-10, 12, and 13.

The bitmaps and lists can include a page pointer table bitmap, virtual page bitmaps, a list of page pointer tables, and virtual page lists. The page pointer table bitmap can be arranged to identify storage status of page pointer tables in the changelog. The virtual page bitmaps can be arranged such that there is a virtual page bitmap for each page pointer table indexed in the page pointer table bitmap. Each virtual page bitmap can be arranged to identify storage status of virtual page addresses in the changelog, using indexes of the virtual page addresses. The list of page pointer tables can be structured as a list of page pointer tables stored in the changelog, where the list is linked to the page pointer table bitmap. The virtual page lists can be arranged as a virtual page list for each page pointer table in the list of page pointer tables. Each virtual page list can identify a set of virtual page addresses stored in the changelog, where the virtual page list is linked to a respective virtual page bitmap. The indexes can be indexed with integers in sequential order from an initial integer and the indexes can be assigned to page pointer tables in a sequential order defined by a number of indexes for each page pointer table. Each page pointer table can have the same number of allocated indexes as the other page pointer tables of the changelog representation. Other arrangements of indexes can be used to operate the changelog. A value of one in a location of the page pointer table bitmap can identify that a page pointer table correlated to the location is stored in the changelog and a value of one in a location of a virtual page bitmap for a page pointer table can identify that a virtual page correlated to the location of the virtual page bitmap for a page pointer table is stored in the changelog.

The system 1100 and its components can be structured in a number of different arrangements. For example, the system 1100 can be arranged with a variation of the type of components that comprise the host 1105, the interface 1120, the memory system 1110, the memory devices 1112-1, 1112-2, 1112-3, 1112-4, 1112-5, and 1112-6, the processing device 1115, and the bus 1129. The host 1105 can comprise one or more processors, which can vary in type. The interface 1120 can be arranged as, but not limited to, a peripheral component interconnect express (PCIe) interface. The memory system 1110 can be, but is not limited to, a SSD. The memory devices 1112-1, 1112-2, 1112-3, 1112-4, 1112-5, and 1112-6 can be NAND memory devices. The processing device 1115 can include or be structured as one or more types of processors compatible with the memory devices 1112-1, 1112-2, 1112-3, 1112-4, 1112-5, and 1112-6. The bus 1127 can be an open NAND flash interface (ONFI) bus for the memory devices 1112-1, 1112-2, 1112-3, 1112-4, 1112-5, and 1112-6 being NAND flash memory devices. A storage device 1114 can be implemented to provide data or parameters used in maintenance of the memory system 1110. The storage device 1114 can include a RAM. Though the storage device 1114 is external to processing device 1115 in memory system 1110 in FIG. 11, the storage device 1114 may be integrated into the processing device 1115. The storage device 1114 can be coupled to the bus 1127 for communication with other components of the memory system 1110. Alternatively, the storage device 1114 can be coupled with processing device 1115 in which the processing device 1115 handles communications between the storage device 1114 and other components of the memory system 1110. The storage device 1114 can be coupled to the bus 1127 and to the processing device 1115.

In various embodiments, the firmware 1125 can have instructions, executable by the processing device 1115, to operate on multiple memory devices of the memory devices 1112-1, 1112-2, 1112-3, 1112-4, 1112-5, and 1112-6. The operations can include providing changelog operations for the memory system 1110. The changelog operations can include a schema to allocate a scalable memory area in the storage device 1114, where storing a L2P changelog can cover potentially the device LBAs of the whole memory system 1110. The allocated area can be structured to provide a rapid access to changelog context avoiding complex searching and ordering algorithms. A changelog element can be accessed by knowing its exact position inside the changelog.

The firmware 1125 can operate in conjunction with storage device 1114 to use bitmaps, lists linked to the bitmaps, and one or more counters that count bits asserted in the bitmaps in the operation of the changelog for memory system 1110. One of the bitmaps can be structured to indicate status of a page pointer table in the changelog and another one of the bitmaps can be structured to indicate status of a virtual page address for the page pointer table. The one or more counters can be implemented to navigate one of the lists linked to one of the bitmaps to reach a cell to update the changelog with respect to a specified virtual page address used as an entry to the changelog. The firmware 1125 can include instructions to update the changelog. These instructions can include instructions to: initiate a search in the changelog in the storage device using a specified virtual page address as an entry to the changelog; identify an index of the specified virtual page address; determine, using the index, a page pointer table related to the index; check, in a page pointer table bitmap, status of the determined page pointer table in the changelog; evaluate a position of the determined page pointer table in a list of page pointer tables, in response to determination of the status of the determined page pointer table as being stored in the changelog, where the list is linked to the page pointer table bitmap; determine a location, corresponding to the index, in a virtual page bitmap for the determined page pointer table; check, at the location in the virtual page bitmap for the determined page pointer table, status of the specified virtual page in the changelog; evaluate position of the index in a virtual page list, in response to determination of the status of the specified virtual page address as being stored in the changelog, where the virtual page list linked to the virtual page bitmap; and update information about the specified virtual page address at the position of the index in the virtual page list. The update of information can include removal of the position of the index in the virtual page list.

The changelog associated with the memory system 1110 can be structured with an allocated amount of memory space in the storage device 1114. The firmware 1125 can include instructions, upon determination that the allocated amount of memory space is used by the changelog, to trigger a procedure to load PPTs from one or more of the memory devices 1112-1, 1112-2, 1112-3, 1112-4, 1112-5, and 1112-6 or other memory device to a RAM or other storage device such as storage device 1114, update the page pointer tables in the RAM, and flush the page pointer tables from the RAM to the one or more memory devices 1112-1, 1112-2, 1112-3, 1112-4, 1112-5, and 1112-6 or other memory device.

The instructions of the firmware 1125 can be executed, for example by processing device 1115, to perform determination of the page pointer table related to the index that includes integer division of the index by a number equal to a total number of page pointer tables allocated for the changelog. Evaluation of the position of the determined page pointer table in the list of page pointer tables can include counting how many bits are asserted in the page pointer table bitmap before a bit for the determined page pointer table. The instructions of the firmware 1125 can be executed, for example by processing device 1115, to perform determination of the location of the index in the virtual page bitmap for the determined page pointer table that includes a modulo operation of the index by a number equal to a total number of page pointer tables allocated for the changelog. Evaluation of the position of the index in the virtual page list can include counting how many bits are asserted in the virtual page list for the determined page pointer table before a bit for the index in the virtual page list.

The system of claim 1100 can include a hardware accelerator 1170 to count how many bits are asserted in a memory range. The hardware accelerator 1170 can be arranged as a component of memory system 1110, or as a stand-alone device, to count bits asserted in bitmaps and lists linked to the bitmaps in storage device 1114 to perform functions of a changelog, as taught herein. The hardware accelerator 1170 can include a number of counters 1172 and a number of registers 1174 to include data related to start of the memory range, direction of the count, and results of the count. The number of counters 1172 can include a counter for each bitmap used in the changelog. The number of counters 1172 can include a single counter for use with the bitmaps and linked lists associated with the changelog. The number of counters 1172 can include a counter for the bitmaps and linked lists for PPTs and another counter for bitmaps and linked lists for VPs. The counters 1172 can be arranged to count a number of bits in a page pointer table bitmap asserted to identify page pointer tables as being stored in the changelog. The counters 1172 can be arranged to count a number of bits in the virtual page bitmap for a given page pointer table asserted to identify virtual page addresses stored in the changelog.

Figure 12:
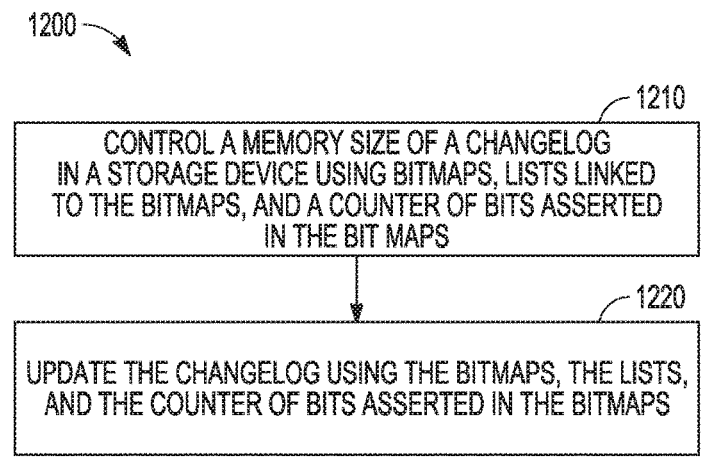
FIG. 12 is a flow diagram of features of an example method of operating a changelog with the changelog implemented to correlate virtual page addresses to physical addresses in a memory device, in accordance with various embodiments.

FIG. 12 is a flow diagram of features of an embodiment of an example method 1200 of operating a changelog with the changelog implemented to correlate virtual page addresses to physical addresses in a memory device. Method 1200 can be implemented using one or more processing devices executing instructions stored in firmware. At 1210, a memory size of the changelog in a storage device is controlled using bitmaps, lists linked to the bitmaps, and a counter of bits asserted in the bitmaps. At 1220, the changelog is updated using the bitmaps, the lists, and the counter of bits asserted in the bitmaps. Using the bitmaps can include using one of the bitmaps to identify status of a page pointer table in the changelog and using another one of the bitmaps to identify status of a virtual page address for the page pointer table. Using the counter can include navigating one of the lists linked to one of the bitmaps to reach a cell to update the changelog with respect to a specified virtual page address used as an entry to the changelog.

Figure 13:
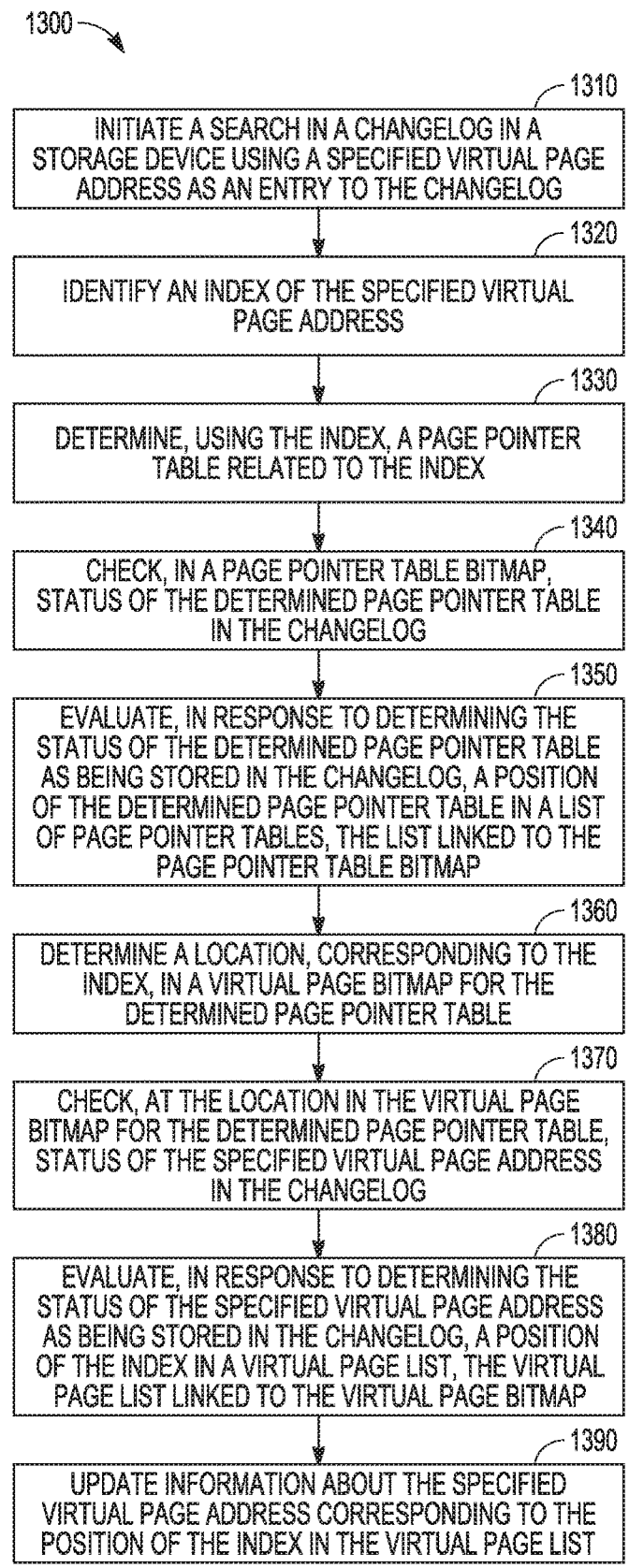
FIG. 13 is a flow diagram of features of an example method of updating a changelog in a storage device with the changelog implemented to correlate virtual page addresses to physical addresses in a memory device, in accordance with various embodiments.

FIG. 13 is a flow diagram of features of an embodiment of an example method 1300 of updating a changelog in a storage device with the changelog implemented to correlate virtual page addresses to physical addresses in a memory device. The updated changelog can be implemented in accordance with the changelog associated with method 1200. Method 1300 can be implemented using one or more processing devices executing instructions stored in firmware. At 1310, a search is initiated in the changelog in the storage device using a specified virtual page address, to be updated, as an entry to the changelog. At 1320, an index of the specified virtual page address is identified. At 1330, using the index, a page pointer table related to the index is determined. Determining the page pointer table related to the index can include performing integer division of the index by a number equal to a total number of page pointer tables allocated for the changelog.

At 1340, status of the determined page pointer table in the changelog checked in a page pointer table bitmap. At 1350, in response to determining the status of the determined page pointer table as being stored in the changelog, a position of the determined page pointer table in a list of page pointer tables is evaluated, where the list is linked to the page pointer table bitmap. Evaluating the position of the determined page pointer table in the list of page pointer tables can include counting how many bits are asserted in the list of page pointer tables before a bit for the determined page pointer table.

At 1360, a location, corresponding to the index, in a virtual page bitmap for the determined page pointer table is determined. Determining the location, corresponding to the index, in the virtual page bitmap for the determined page pointer table can include performing a modulo operation of the index by a number equal to a total number of page pointer tables allocated for the changelog. At 1370, status of the specified virtual page address in the changelog is checked at the location in the virtual page bitmap for the determined page pointer table.

At 1380, in response to determining the status of the specified virtual page address as being stored in the changelog, a position of the index in a virtual page list is evaluated, where the virtual page list is linked to the virtual page bitmap. Evaluating the position of the index in the virtual page list can include counting how many bits are asserted in the virtual page list for the determined page pointer table before a bit for the index in the virtual page list. At 1390, information about the specified virtual page address corresponding to the position of the index the virtual page list is updated.

Variations of method 1200, methods similar to method 1200, method 1300, methods similar to method 1300, combinations of method 1200 and method 1300 and combinations of methods similar to method 1200 and similar to method 1300 can include a number of different embodiments that may be combined depending on the application of such methods and/or the architecture of systems in which such methods are implemented.

Firmware for operation of one or more memory devices can comprise instructions, such as a microcode, which when executed by a processing device, can cause performance of operations, the operations including operations to operate a changelog with the changelog implemented to correlate virtual page addresses to physical addresses in a memory device. The processing device can be implemented as a set of one or more processing devices, such as but not limited to a set of one or more processors, a set of one or more memory controllers, or combinations thereof.

The operations performed by executing instructions of firmware by a processing device can include operations to perform the tasks of method 1200, methods similar to method 1200, method 1300, methods similar to method 1300, combinations of method 1200 and method 1300, combinations of methods similar to method 1200 and similar to method 1300, and other similar operations as taught herein. The operations performed by executing instructions of firmware by a processing device can include operations to perform functions of systems as taught herein. Variations of instructions of the above firmware or similar firmware can include a number of different embodiments that may be combined depending on the application of such firmware and/or the architecture of systems in which such firmware is implemented. Such instructions of the firmware, which when executed by one or more processing devices, can cause performance of operations, which operations can include controlling a memory size of a changelog in a storage device using bitmaps, lists linked to the bitmaps, and a counter of bits asserted in the bitmaps, the changelog implemented to correlate virtual page addresses to physical addresses in a memory device; and updating the changelog using the bitmaps, the lists, and the counter of bits asserted in the bitmaps. Operations using bitmaps can include using one of the bitmaps to identify status of a page pointer table in the changelog and using another one of the bitmaps to identify status of a virtual page address for the page pointer table. Operations using the counter can include navigating one of the lists linked to one of the bitmaps to reach a cell to update the changelog with respect to a specified virtual page address used as an entry to the changelog.

Instructions of the firmware, which when executed by one or more processing devices, can cause performance of operations to update the changelog, which operations can include: initiating a search in the changelog in the storage device using a specified virtual page address as an entry to the changelog; identifying an index of the specified virtual page address; determining, using the index, a page pointer table related to the index; checking, in a page pointer table bitmap, status of the determined page pointer table in the changelog; in response to determining the status of the determined page pointer table as being stored in the changelog, evaluating a position of the determined page pointer table in a list of page pointer tables, the list linked to the page pointer table bitmap; determining a location, corresponding to the index, in a virtual page bitmap for the determined page pointer table; checking, at the location in the virtual page bitmap for the determined page pointer table, status of the specified virtual page address in the changelog; in response to determining the status of the specified virtual page address as being stored in the changelog, evaluating a position of the index in a virtual page list, the virtual page list linked to the virtual page bitmap; and updating information about the specified virtual page address corresponding to the position of the index in the virtual page list.

Variations of instructions of the above firmware or similar firmware can include a number of different embodiments that may be combined depending on the application of such firmware and/or the architecture of systems in which such firmware is implemented. Operations from execution of firmware instructions can include a number of operations. Operations that determine the page pointer table related to the index can include performing integer division of the index by a number equal to a total number of page pointer tables allocated for the changelog. Operations that determine the location, corresponding to the index, in the virtual page bitmap for the determined page pointer table can include performing a modulo operation of the index by a number equal to a total number of page pointer tables allocated for the changelog. Operations that evaluate the position of the determined page pointer table in the list of page pointer tables can include counting how many bits are asserted in the list of page pointer tables before a bit for the determined page pointer table. Operations that evaluate the position of the index in the virtual page list can include counting how many bits are asserted in the virtual page list for the determined page pointer table before a bit for the index in the virtual page list.

In various embodiments, a system can comprise a memory device and a storage device storing a changelog in which identification of a virtual page address is an entry point to determine a physical address in the memory device, where the changelog implemented to correlate virtual page addresses to physical addresses in a memory device. The changelog can be used for a set of memory devices. The changelog can include: a page pointer table bitmap to identify storage status of page pointer tables in the changelog; a virtual page bitmap for each page pointer table indexed in the page pointer table bitmap, each virtual page bitmap arranged to identify storage status of virtual page addresses in the changelog, using indexes of the virtual page addresses; a list of page pointer tables stored in the changelog, the list linked to the page pointer table bitmap; and a virtual page list for each page pointer table in the list of page pointer tables, each virtual page list identifying virtual page addresses stored in the changelog, the virtual page list linked to the virtual page bitmap.

Variations of a system and its features, as taught herein, can include a number of different embodiments and features that may be combined depending on the application of such systems and/or the architecture in which systems are implemented. Features of such systems can include the indexes being indexed with integers in sequential order from an initial integer, where the indexes are assigned to page pointer tables in a sequential order defined by a number of indexes for each page pointer table. Each page pointer table can have the same number of allocated indexes as the other page pointer tables of the changelog representation. A value of one in a location of the page pointer table bitmap can identify that a page pointer table correlated to the location is stored in the changelog and a value of one in a location of a virtual page bitmap for a page pointer table can identify that a virtual page correlated to the location of the virtual page bitmap for a page pointer table is stored in the changelog.

Variations of a system, as taught herein, can include a counter to count a number of bits in the page pointer table bitmap asserted to identify page pointer tables as being stored in the changelog. Such a system can include a counter to count a number of bits in the virtual page bitmap for a given page pointer table asserted to identify virtual page addresses stored in the changelog. Multiple counter can be realized by a single counter with a controller or instructions in firmware to regulate the use of the single counter.

Variations of a system, as taught herein, can include the changelog having an allocated amount of memory space in the storage device. The system can be configured, upon determination that the allocated amount of memory space is used by the changelog, to trigger a procedure to load page pointer tables from a NAND memory device to a RAM, update the page pointer tables in the RAM, and flush the page pointer tables from the RAM to the NAND memory device.

In various embodiments, a system can comprise firmware having stored instructions, executable by one or more processing devices, to perform operations to: control a memory size of a changelog in a storage device using bitmaps, lists linked to the bitmaps, and a counter of bits asserted in the bitmaps, the changelog implemented to correlate virtual page addresses to physical addresses in a memory device; and update the changelog using the bitmaps, the lists, and the counter of bits asserted in the bitmaps. One of the bitmaps can be structured to indicate status of a page pointer table in the changelog and another one of the bitmaps can be structured to indicate status of a virtual page address for the page pointer table. The counter can be implemented to navigate one of the lists linked to one of the bitmaps to reach a cell to update the changelog with respect to a specified virtual page address used as an entry to the changelog. The bitmaps, the linked lists, and the counter, which can be realized as one or more counters, can be structured to perform various functions as taught herein. The system can include a hardware accelerator to count how many bits are asserted in a memory range. The hardware accelerator can include a number of registers to include data related to start of the memory range, direction of the count, and results of the count.

Variations of a system and its features, as taught herein, can include a number of different embodiments that may be combined depending on the application of such systems and/or the architecture in which systems are implemented. Such variations of a system can include various operations from execution of instructions in the firmware. The firmware can have instructions to update the changelog, including instructions to; initiate a search in the changelog in the storage device using a specified virtual page address as an entry to the changelog; identify an index of the specified virtual page address; determine, using the index, a page pointer table related to the index; check, in a page pointer table bitmap, status of the determined page pointer table in the changelog; in response to determination of the status of the determined page pointer table as being stored in the changelog, evaluate a position of the determined page pointer table in a list of page pointer tables, the list linked to the page pointer table bitmap; determine a location, corresponding to the index, in a virtual page bitmap for the determined page pointer table; check, at the location in the virtual page bitmap for the determined page pointer table, status of the specified virtual page in the changelog; in response to determination of the status of the specified virtual page address as being stored in the changelog, evaluate position of the index in a virtual page list, the virtual page list linked to the virtual page bitmap; and update information about the specified virtual page address at the position of the index in the virtual page list.

Various operations from execution of instructions in the firmware can include a number of determinations, evaluations, and updates. Determination of the page pointer table related to the index can include integer division of the index by a number equal to a total number of page pointer tables allocated for the changelog. Evaluation of the position of the determined page pointer table in the list of page pointer tables can include counting how many bits are asserted in the page pointer table bitmap before a bit for the determined page pointer table. Determination of the location of the index in the virtual page bitmap for the determined page pointer table can include a modulo operation of the index by a number equal to a total number of page pointer tables allocated for the changelog. Evaluation of the position of the index in the virtual page list can include counting how many bits are asserted in the virtual page list for the determined page pointer table before a bit for the index in the virtual page list. Update of information can include removal of the position of the index in the virtual page list.

Figure 14:
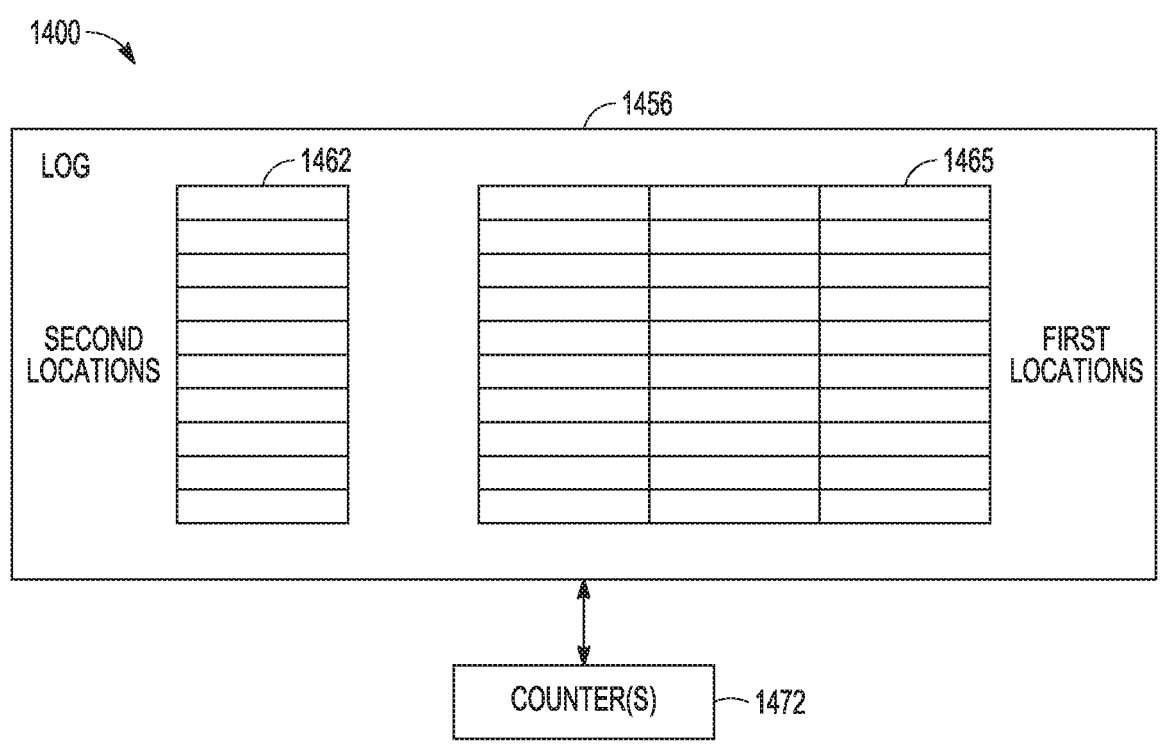
FIG. 14 is a block diagram of an example system having a log correlating virtual page addresses for one or more memory devices to physical addresses of the one or more memory devices, in accordance with various embodiments.

FIG. 14 is a block diagram of an embodiment of an example system 1400 having a log 1456 correlating virtual page addresses for one or more memory devices to physical addresses of the one or more memory devices. The system 1400 can also include a set of one or more counters 1472. The log 1456 can include first locations 1465 correlated to multiple indexes of respective virtual page addresses, where the first locations 1465 can contain identifiers of status of the respective virtual page addresses in the log 1456. The log 1456 can include second locations 1461 to identify status of page pointer tables in the log 1456, each second location 1461 capable of being correlated to a respective set of the multiple indexes. The one or more counters 1472 can be arranged to count a number of the second locations 1461 that contain an identifier that a page pointer table, associated with a respective second location, is stored in the log 1456, and to count a number of indexes in the set correlated to the respective second location. Each element of the first locations 1465 and each element of the second locations 1461 can have locations for one or more bits. The log 1461 can be arranged with the first locations 1465 and the second locations 1461 arranged as bitmaps.

Variations of the system 1400 and its features, as taught herein, can include a number of different embodiments that may be combined depending on the application of such systems and/or the architecture in which systems are implemented. Such variations of the system 1400 can include each second location 1461 being capable of being correlated to a maximum number of multiple indexes, where the maximum number is the same for each second location. Such variations of the system 1400 can include a page pointer table related to a specific virtual page address, used as a search entry to the log 1461, being identified by an integer division of an index of the specific virtual page address by the maximum number. Such variations of the system 1400 can include an entry in the log 1456 being capable of being overwritten. The log 1456 can be contained in a random access memory separate from the memory device. The one or more counters 1472 can include a hardware accelerator. The system 1400 can be arranged to have an architecture and function as a changelog as taught herein.

The following are example embodiments of systems and methods, in accordance with the teachings herein.

An example system 1 can comprise: a memory device; and a storage device storing a changelog in which identification of a virtual page address is an entry point to determine a physical address in the memory device, the changelog implemented to correlate virtual page addresses to physical addresses in a memory device, the changelog including: a page pointer table bitmap to identify storage status of page pointer tables in the changelog; a virtual page bitmap for each page pointer table indexed in the page pointer table bitmap, each virtual page bitmap arranged to identify storage status of virtual page addresses in the changelog, using indexes of the virtual page addresses; a list of page pointer tables stored in the changelog, the list linked to the page pointer table bitmap; and a virtual page list for each page pointer table in the list of page pointer tables, each virtual page list identifying virtual page addresses stored in the changelog, the virtual page list linked to the virtual page bitmap.

An example system 2 can include features of example system 1 and can include the indexes being indexed with integers in sequential order from an initial integer and the indexes are assigned to page pointer tables in a sequential order defined by a number of indexes for each page pointer table.

An example system 3 can include features of any of the preceding example systems and can include each page pointer table having the same number of allocated indexes as the other page pointer tables of the changelog representation.

An example system 4 can include features of any of the preceding example systems and can include a value of one in a location of the page pointer table bitmap identifying that a page pointer table correlated to the location is stored in the changelog and a value of one in a location of a virtual page bitmap for a page pointer table identifying that a virtual page correlated to the location of the virtual page bitmap for a page pointer table is stored in the changelog.

An example system 5 can include features of any of the preceding example systems and can include a counter to count a number of bits in the page pointer table bitmap asserted to identify page pointer tables as being stored in the changelog.

An example system 6 can include features of any of the preceding example systems and can include a counter to count a number of bits in the virtual page bitmap for a given page pointer table asserted to identify virtual page addresses stored in the changelog.

An example system 7 can include features of any of the preceding example systems and can include the changelog having an allocated amount of memory space in the storage device and the system being configured, upon determination that the allocated amount of memory space is used by the changelog, to trigger a procedure to load page pointer tables from a not-and type (NAND) memory device to a random access memory (RAM), update the page pointer tables in the RAM, and flush the page pointer tables from the RAM to the NAND memory device.

An example system 8 can comprise: firmware having stored instructions, executable by a processing device, to perform operations to: control a memory size of a changelog in a storage device using bitmaps, lists linked to the bitmaps, and a counter of bits asserted in the bitmaps, the changelog implemented to correlate virtual page addresses to physical addresses in a memory device; and update the changelog using the bitmaps, the lists, and the counter of bits asserted in the bitmaps.

An example system 9 can include features of example system 8 and can include one of the bitmaps being structured to indicate status of a page pointer table in the changelog and another one of the bitmaps being structured to indicate status of a virtual page address for the page pointer table.

An example system 10 can include features of any of the preceding example systems 8 and 9 and can include the counter being implemented to navigate one of the lists linked to one of the bitmaps to reach a cell to update the changelog with respect to a specified virtual page address used as an entry to the changelog.

An example system 11 can include features of any of the preceding example systems 8-10 and can include the firmware having instructions to update the changelog, including instructions to: initiate a search in the changelog in the storage device using a specified virtual page address as an entry to the changelog; identify an index of the specified virtual page address; determine, using the index, a page pointer table related to the index; check, in a page pointer table bitmap, status of the determined page pointer table in the changelog; in response to determination of the status of the determined page pointer table as being stored in the changelog, evaluate a position of the determined page pointer table in a list of page pointer tables, the list linked to the page pointer table bitmap; determine a location, corresponding to the index, in a virtual page bitmap for the determined page pointer table; check, at the location in the virtual page bitmap for the determined page pointer table, status of the specified virtual page in the changelog; in response to determination of the status of the specified virtual page address as being stored in the changelog, evaluate position of the index in a virtual page list, the virtual page list linked to the virtual page bitmap; and update information about the specified virtual page address at the position of the index in the virtual page list.

An example system 12 can include features of any of the preceding example systems 8-11 and can include determination of the page pointer table related to the index to include integer division of the index by a number equal to a total number of page pointer tables allocated for the changelog.

An example system 13 can include features of any of the preceding example systems 8-12 and can include evaluation of the position of the determined page pointer table in the list of page pointer tables to include counting how many bits are asserted in the page pointer table bitmap before a bit for the determined page pointer table.

An example system 14 can include features of any of the preceding example systems 8-13 and can include determination of the location of the index in the virtual page bitmap for the determined page pointer table to include a modulo operation of the index by a number equal to a total number of page pointer tables allocated for the changelog.

An example system 15 can include features of any of the preceding example systems 8-14 and can include evaluation of the position of the index in the virtual page list to include counting how many bits are asserted in the virtual page list for the determined page pointer table before a bit for the index in the virtual page list.

An example system 16 can include features of any of the preceding example systems 8-15 and can include update of information to include removal of the position of the index in the virtual page list.

An example system 17 can include features of any of the preceding example systems 8-16 and can include a hardware accelerator to count how many bits are asserted in a memory range.

An example system 18 can include features of any of the preceding example systems 8-17 and can include the hardware accelerator to include a number of registers to include data related to start of the memory range, direction of the count, and results of the count.

An example system 19 can comprise: a log correlating virtual page addresses for a memory device to physical addresses of the memory device, the log including: first locations correlated to multiple indexes of respective virtual page addresses, the first locations containing identifiers of status of the respective virtual page addresses in the log; second locations to identify status of page pointer tables in the log, each second location capable of being correlated to a respective set of the multiple indexes; and one or more counters to count a number of the second locations that contain an identifier that a page pointer table, associated with a respective second location, is stored in the log, and to count a number of indexes in the set correlated to the respective second location.

An example system 20 can include features of example system 19 and can include each second location being capable of being correlated to a maximum number of multiple indexes, the maximum number being the same for each second location.

An example system 21 can include features of any of the preceding example systems 19 and 20 and can include a page pointer table related to a specific virtual page address, used as a search entry to the log, being identified by an integer division of an index of the specific virtual page address by the maximum number.

An example system 22 can include features of any of the preceding example systems 19-21 and can include an entry in the log is capable of being overwritten.

An example system 23 can include features of any of the preceding example systems 19-22 and can include the log being contained in a random access memory separate from the memory device.

An example system 24 can include features of any of the preceding example systems 19-23 and can include the one or more counters include a hardware accelerator.

An example method 1 can comprise: controlling a memory size of a changelog in a storage device using bitmaps, lists linked to the bitmaps, and a counter of bits asserted in the bitmaps, the changelog implemented to correlate virtual page addresses to physical addresses in a memory device; and updating the changelog using the bitmaps, the lists, and the counter of bits asserted in the bitmaps.

An example method 2 can include features of example method 1 and can include using bitmaps includes using one of the bitmaps to identify status of a page pointer table in the changelog and using another one of the bitmaps to identify status of a virtual page address for the page pointer table.

An example method 3 can include features of any of the preceding example methods and can include using the counter to include navigating one of the lists linked to one of the bitmaps to reach a cell to update the changelog with respect to a specified virtual page address used as an entry to the changelog.

An example method 4 can include features of any of the preceding example methods and can include updating the changelog to include: initiating a search in the changelog in the storage device using a specified virtual page address as an entry to the changelog; identifying an index of the specified virtual page address; determining, using the index, a page pointer table related to the index; checking, in a page pointer table bitmap, status of the determined page pointer table in the changelog; in response to determining the status of the determined page pointer table as being stored in the changelog, evaluating a position of the determined page pointer table in a list of page pointer tables, the list linked to the page pointer table bitmap; determining a location, corresponding to the index, in a virtual page bitmap for the determined page pointer table; checking, at the location in the virtual page bitmap for the determined page pointer table, status of the specified virtual page address in the changelog; in response to determining the status of the specified virtual page address as being stored in the changelog, evaluating a position of the index in a virtual page list, the virtual page list linked to the virtual page bitmap; and updating information about the specified virtual page address corresponding to the position of the index in the virtual page list.

An example method 5 can include features of any of the preceding example methods and can include determining the page pointer table related to the index to include performing integer division of the index by a number equal to a total number of page pointer tables allocated for the changelog, and determining the location, corresponding to the index, in the virtual page bitmap for the determined page pointer table to include performing a modulo operation of the index by a number equal to a total number of page pointer tables allocated for the changelog.

An example method 6 can include features of any of the preceding example methods and can include evaluating the position of the determined page pointer table in the list of page pointer tables to include counting how many bits are asserted in the list of page pointer tables before a bit for the determined page pointer table, and evaluating the position of the index in the virtual page list includes counting how many bits are asserted in the virtual page list for the determined page pointer table before a bit for the index in the virtual page list.

An example method 7 can include features of any of the preceding example methods and can include performing functions associated with any features of example systems 1-7, example systems 8-18, and example systems 19-24.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.).

According to one or more embodiments, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

In various embodiments, a L2P changelog covering potentially the LBAs of a complete set of memory devices can be realized as a scalable memory area that can be allocated corresponding to usage. The allocated area can be structured to provide a rapid access to changelog context avoiding complex searching and ordering algorithms. The changelog element can be accessed knowing its exact position inside the changelog. The steps used to know the element position inside the changelog can be deterministic and predictable in such representations of changelogs. A single virtual page overwrite can be performed directly on the specific VP without consuming allocation area in such changelog architectures that can avoid actions to log the history of the specific VP.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A method comprising:
   controlling a memory size of a changelog in a storage device using bitmaps, lists linked to the bitmaps, and a counter of bits asserted in the bitmaps, the changelog implemented to correlate virtual page addresses to physical addresses in a memory device; and
   updating the changelog using the bitmaps, the lists, and the counter of bits asserted in the bitmaps, wherein the bitmaps include a page pointer table bitmap arranged to identify storage status of page pointer tables in the changelog.

2. The method of claim 1, wherein using the counter includes navigating one of the lists linked to one of the bitmaps to reach a cell to update the changelog with respect to a specified virtual page address used as an entry to the changelog.

3. A method comprising:
   controlling a memory size of a changelog in a storage device using bitmaps, lists linked to the bitmaps, and a counter of bits asserted in the bitmaps, the changelog implemented to correlate virtual page addresses to physical addresses in a memory device; and
   updating the changelog using the bitmaps, the lists, and the counter of bits asserted in the bitmaps, wherein using the bitmaps includes using one of the bitmaps to identify status of a page pointer table in the changelog and using another one of the bitmaps to identify status of a virtual page address for the page pointer table.

4. A method comprising:
   controlling a memory size of a changelog in a storage device using bitmaps, lists linked to the bitmaps, and a counter of bits asserted in the bitmaps, the changelog implemented to correlate virtual page addresses to physical addresses in a memory device; and
   updating the changelog using the bitmaps, the lists, and the counter of bits asserted in the bitmaps, wherein updating the changelog includes:
     initiating a search in the changelog in the storage device using a specified virtual page address as an entry to the changelog;
     identifying an index of the specified virtual page address;
     determining, using the index, a page pointer table related to the index;
     checking, in a page pointer table bitmap, status of the determined page pointer table in the changelog;
     in response to determining the status of the determined page pointer table as being stored in the changelog, evaluating a position of the determined page pointer table in a list of page pointer tables, the list linked to the page pointer table bitmap;

determining a location, corresponding to the index, in a virtual page bitmap for the determined page pointer table;

checking, at the location in the virtual page bitmap for the determined page pointer table, status of the specified virtual page address in the changelog;

in response to determining the status of the specified virtual page address as being stored in the changelog, evaluating a position of the index in a virtual page list, the virtual page list linked to the virtual page bitmap; and updating information about the specified virtual page address corresponding to the position of the index in the virtual page list.

5. The method of claim 4, wherein determining the page pointer table related to the index includes performing integer division of the index by a number equal to a total number of page pointer tables allocated for the changelog, and determining the location, corresponding to the index, in the virtual page bitmap for the determined page pointer table includes performing a modulo operation of the index by a number equal to a total number of page pointer tables allocated for the changelog.

6. The method of claim 4, wherein evaluating the position of the determined page pointer table in the list of page pointer tables includes counting how many bits are asserted in the list of page pointer tables before a bit for the determined page pointer table, and evaluating the position of the index in the virtual page list includes counting how many bits are asserted in the virtual page list for the determined page pointer table before a bit for the index in the virtual page list.

7. A system comprising:
a memory device; and
a storage device storing a changelog in which identification of a virtual page address is an entry point to determine a physical address in the memory device, the changelog implemented to correlate virtual page addresses to physical addresses in a memory device, the changelog including:
a page pointer table bitmap to identify storage status of page pointer tables in the changelog;
a virtual page bitmap for each page pointer table indexed in the page pointer table bitmap, each virtual page bitmap arranged to identify storage status of virtual page addresses in the changelog, using indexes of the virtual page addresses;
a list of page pointer tables stored in the changelog, the list linked to the page pointer table bitmap; and
a virtual page list for each page pointer table in the list of page pointer tables, each virtual page list identifying virtual page addresses stored in the changelog, the virtual page list linked to the virtual page bitmap.

8. The system of claim 7, wherein the indexes are indexed with integers in sequential order from an initial integer and the indexes are assigned to page pointer tables in a sequential order defined by a number of indexes for each page pointer table.

9. The system of claim 8, wherein each page pointer table has the same number of allocated indexes as the other page pointer tables of the changelog representation.

10. The system of claim 7, wherein a value of one in a location of the page pointer table bitmap identifies that a page pointer table correlated to the location is stored in the changelog and a value of one in a location of a virtual page bitmap for a page pointer table identifies that a virtual page correlated to the location of the virtual page bitmap for a page pointer table is stored in the changelog.

11. The system of claim 7, wherein the system includes a counter to count a number of bits in the page pointer table bitmap asserted to identify page pointer tables as being stored in the changelog.

12. The system of claim 7, wherein the system includes a counter to count a number of bits in the virtual page bitmap for a given page pointer table asserted to identify virtual page addresses stored in the changelog.

13. The system of claim 7, wherein the changelog has an allocated amount of memory space in the storage device and the system is configured, upon determination that the allocated amount of memory space is used by the changelog, to trigger a procedure to load page pointer tables from a not-and type (NAND) memory device to a random access memory (RAM), update the page pointer tables in the RAM, and flush the page pointer tables from the RAM to the NAND memory device.

14. A system comprising:
firmware having stored instructions, executable by a processing device, to perform operations to:
control a memory size of a changelog in a storage device using bitmaps, lists linked to the bitmaps, and a counter of bits asserted in the bitmaps, the changelog implemented to correlate virtual page addresses to physical addresses in a memory device; and
update the changelog using the bitmaps, the lists, and the counter of bits asserted in the bitmaps, wherein the bitmaps include a page pointer table bitmap arranged to identify storage status of page pointer tables in the changelog.

15. The system of claim 14, wherein the counter is implemented to navigate one of the lists linked to one of the bitmaps to reach a cell to update the changelog with respect to a specified virtual page address used as an entry to the changelog.

16. A system comprising:
firmware having stored instructions, executable by a processing device, to perform operations to:
control a memory size of a changelog in a storage device using bitmaps, lists linked to the bitmaps, and a counter of bits asserted in the bitmaps, the changelog implemented to correlate virtual page addresses to physical addresses in a memory device; and
update the changelog using the bitmaps, the lists, and the counter of bits asserted in the bitmaps, wherein one of the bitmaps is structured to indicate status of a page pointer table in the changelog and another one of the bitmaps is structured to indicate status of a virtual page address for the page pointer table.

17. A system comprising:
firmware having stored instructions, executable by a processing device, to perform operations to:
control a memory size of a changelog in a storage device using bitmaps, lists linked to the bitmaps, and a counter of bits asserted in the bitmaps, the changelog implemented to correlate virtual page addresses to physical addresses in a memory device; and
update the changelog using the bitmaps, the lists, and the counter of bits asserted in the bitmaps, wherein the firmware has instructions to update the changelog, including instructions to:

initiate a search in the changelog in the storage device using a specified virtual page address as an entry to the changelog;

identify an index of the specified virtual page address;

determine, using the index, a page pointer table related to the index;

check, in a page pointer table bitmap, status of the determined page pointer table in the changelog;

in response to determination of the status of the determined page pointer table as being stored in the changelog, evaluate a position of the determined page pointer table in a list of page pointer tables, the list linked to the page pointer table bitmap;

determine a location, corresponding to the index, in a virtual page bitmap for the determined page pointer table;

check, at the location in the virtual page bitmap for the determined page pointer table, status of the specified virtual page in the changelog;

in response to determination of the status of the specified virtual page address as being stored in the changelog, evaluate position of the index in a virtual page list, the virtual page list linked to the virtual page bitmap; and update information about the specified virtual page address at the position of the index in the virtual page list.

18. The system of claim 17, wherein determination of the page pointer table related to the index includes integer division of the index by a number equal to a total number of page pointer tables allocated for the changelog.

19. The system of claim 17, wherein evaluation of the position of the determined page pointer table in the list of page pointer tables includes counting how many bits are asserted in the page pointer table bitmap before a bit for the determined page pointer table.

20. The system of claim 17, wherein determination of the location of the index in the virtual page bitmap for the determined page pointer table includes a modulo operation of the index by a number equal to a total number of page pointer tables allocated for the changelog.

21. The system of claim 17, wherein evaluation of the position of the index in the virtual page list includes counting how many bits are asserted in the virtual page list for the determined page pointer table before a bit for the index in the virtual page list.

22. The system of claim 17, wherein update of information includes removal of the position of the index in the virtual page list.

23. The system of claim 17, wherein the system includes a hardware accelerator to count how many bits are asserted in a memory range.

24. The system of claim 23, wherein the hardware accelerator includes a number of registers to include data related to start of the memory range, direction of the count, and results of the count.

25. A system comprising:
a log correlating virtual page addresses for a memory device to physical addresses of the memory device, the log including:
first locations correlated to multiple indexes of respective virtual page addresses, the first locations containing identifiers of status of the respective virtual page addresses in the log; and
second locations to identify status of page pointer tables in the log, each second location capable of being correlated to a respective set of the multiple indexes; and
one or more counters to count a number of the second locations that contain an identifier that a page pointer table, associated with a respective second location, is stored in the log, and to count a number of indexes in the set correlated to the respective second location.

26. The system of claim 25, wherein each second location is capable of being correlated to a maximum number of multiple indexes, the maximum number being the same for each second location.

27. The system of claim 26, wherein a page pointer table, related to a specific virtual page address used as a search entry to the log, is identified by use of an integer division of an index of the specific virtual page address by the maximum number.

28. The system of claim 25, wherein an entry in the log is capable of being overwritten.

29. The system of claim 25, wherein the log is contained in a random access memory separate from the memory device.

30. The system of claim 25, wherein the one or more counters include a hardware accelerator.

* * * * *